(12) United States Patent
Gower et al.

(10) Patent No.: US 7,581,073 B2
(45) Date of Patent: Aug. 25, 2009

(54) SYSTEMS AND METHODS FOR PROVIDING DISTRIBUTED AUTONOMOUS POWER MANAGEMENT IN A MEMORY SYSTEM

(75) Inventors: Kevin C. Gower, Lagrangeville, NY (US); Robert B. Tremaine, Stormville, NY (US)

(73) Assignee: International Business Machines Corporation, Armonk, NY (US)

( * ) Notice: Subject to any disclaimer, the term of this patent is extended or adjusted under 35 U.S.C. 154(b) by 435 days.

(21) Appl. No.: 11/463,483

(22) Filed: Aug. 9, 2006

(65) Prior Publication Data

US 2008/0040562 A1 Feb. 14, 2008

(51) Int. Cl.
*G06F 12/00* (2006.01)
(52) U.S. Cl. ............................ 711/154; 711/5; 711/170
(58) Field of Classification Search ........................ None
See application file for complete search history.

(56) References Cited

U.S. PATENT DOCUMENTS

| | | |
|---|---|---|
| 2,842,682 A | 7/1958 | Clapper |
| 3,333,253 A | 7/1967 | Sahulka |
| 3,395,400 A | 7/1968 | De Witt |
| 3,825,904 A | 7/1974 | Burk et al. ............... 340/172.5 |
| 4,028,675 A | 6/1977 | Frankenberg ............... 711/106 |
| 4,135,240 A | 1/1979 | Ritchie |
| 4,150,428 A | 4/1979 | Inrig et al. |
| 4,472,780 A | 9/1984 | Chenoweth et al. |
| 4,475,194 A | 10/1984 | LaVallee et al. ............... 371/10 |
| 4,486,739 A | 12/1984 | Franaszek et al. ........... 340/347 |
| 4,641,263 A | 2/1987 | Perlman et al. |
| 4,654,857 A | 3/1987 | Samson et al. |
| 4,723,120 A | 2/1988 | Petty, Jr. ................ 340/825.02 |
| 4,740,916 A | 4/1988 | Martin ....................... 364/900 |
| 4,796,231 A | 1/1989 | Pinkham ................ 365/189.05 |
| 4,803,485 A | 2/1989 | Rypinski .................... 370/452 |
| 4,833,605 A | 5/1989 | Terada et al. ................ 364/200 |
| 4,839,534 A | 6/1989 | Clasen ....................... 307/269 |
| 4,943,984 A | 7/1990 | Pechanek et al. ............ 375/109 |
| 4,985,828 A | 1/1991 | Shimizu et al. ............. 364/200 |

(Continued)

FOREIGN PATENT DOCUMENTS

EP 0229316 A2 7/1987

(Continued)

OTHER PUBLICATIONS

PCT International Search Report PCT/EP2006/068984. Mailed Feb. 16, 2007.

(Continued)

*Primary Examiner*—Jack A Lane
(74) *Attorney, Agent, or Firm*—Cantor Colburn LLP

(57) ABSTRACT

Systems and methods for providing distributed autonomous power management in a memory system. Embodiments include a memory system for storing and retrieving data for a processing system. The memory system includes a memory controller for receiving and responding to memory access requests, a memory bus in communication with the memory controller, a plurality of memory devices, and a control unit external to the memory controller. The memory devices are in communication with the memory controller via the memory bus, with one or more of the memory devices being associated with a group. The control unit autonomously manages power within and for the group of memory devices.

29 Claims, 8 Drawing Sheets

U.S. PATENT DOCUMENTS

| | | | |
|---|---|---|---|
| 5,053,947 A | 10/1991 | Heibel et al. | 364/200 |
| 5,177,375 A | 1/1993 | Ogawa et al. | |
| 5,206,946 A | 4/1993 | Brunk | 710/2 |
| 5,214,747 A | 5/1993 | Cok | 395/27 |
| 5,265,049 A | 11/1993 | Takasugi | |
| 5,265,212 A | 11/1993 | Bruce, II | 710/113 |
| 5,287,531 A | 2/1994 | Rogers, Jr. et al. | 395/800 |
| 5,347,270 A | 9/1994 | Matsuda et al. | 340/2.21 |
| 5,357,621 A | 10/1994 | Cox | |
| 5,375,127 A | 12/1994 | Leak | |
| 5,387,911 A | 2/1995 | Gleichert et al. | 341/95 |
| 5,394,535 A | 2/1995 | Ohuchi | 711/155 |
| 5,454,091 A | 9/1995 | Sites et al. | 395/413 |
| 5,475,690 A | 12/1995 | Burns et al. | 370/105.3 |
| 5,513,135 A | 4/1996 | Dell et al. | 365/52 |
| 5,517,626 A | 5/1996 | Archer et al. | |
| 5,522,064 A | 5/1996 | Aldereguia et al. | |
| 5,544,309 A | 8/1996 | Chang et al. | |
| 5,546,023 A | 8/1996 | Borkar et al. | |
| 5,561,826 A | 10/1996 | Davies et al. | |
| 5,592,632 A | 1/1997 | Leung et al. | 395/306 |
| 5,594,925 A | 1/1997 | Harder et al. | |
| 5,611,055 A | 3/1997 | Krishan et al. | 395/281 |
| 5,613,077 A | 3/1997 | Leung et al. | 395/306 |
| 5,627,963 A | 5/1997 | Gabillard et al. | 714/42 |
| 5,629,685 A | 5/1997 | Allen et al. | 340/825.02 |
| 5,661,677 A | 8/1997 | Rondeau, II et al. | 365/63 |
| 5,666,480 A | 9/1997 | Leung et al. | 395/180 |
| 5,684,418 A | 11/1997 | Yanagiuchi | |
| 5,706,346 A | 1/1998 | Katta et al. | |
| 5,754,804 A | 5/1998 | Cheselka et al. | |
| 5,764,155 A | 6/1998 | Kertesz et al. | 340/825.08 |
| 5,822,749 A | 10/1998 | Agarwal | 707/2 |
| 5,852,617 A | 12/1998 | Mote, Jr. | 714/726 |
| 5,870,325 A | 2/1999 | Nielsen et al. | 365/63 |
| 5,872,996 A | 2/1999 | Barth et al. | 395/853 |
| 5,917,760 A | 6/1999 | Millar | |
| 5,926,838 A | 7/1999 | Jeddeloh | 711/167 |
| 5,928,343 A | 7/1999 | Farmwald et al. | 710/104 |
| 5,930,273 A | 7/1999 | Mukojima | 714/776 |
| 5,959,914 A | 9/1999 | Gates et al. | |
| 5,973,951 A | 10/1999 | Bechtolsheim et al. | 365/52 |
| 5,974,493 A | 10/1999 | Okumura et al. | 710/307 |
| 5,995,405 A | 11/1999 | Trick | 365/63 |
| 6,003,121 A | 12/1999 | Wirt | |
| 6,011,732 A | 1/2000 | Harrison et al. | |
| 6,038,132 A | 3/2000 | Tokunaga et al. | 361/760 |
| 6,049,476 A | 4/2000 | Laudon et al. | 365/52 |
| 6,076,158 A | 6/2000 | Sites et al. | 712/230 |
| 6,078,515 A | 6/2000 | Nielsen et al. | 365/63 |
| 6,081,868 A | 6/2000 | Brooks | |
| 6,085,276 A | 7/2000 | VanDoren et al. | |
| 6,096,091 A | 8/2000 | Hartmann | 716/17 |
| 6,128,746 A | 10/2000 | Clark et al. | 713/324 |
| 6,145,028 A | 11/2000 | Shank et al. | |
| 6,170,047 B1 | 1/2001 | Dye | 711/170 |
| 6,170,059 B1 | 1/2001 | Pruett et al. | 713/200 |
| 6,173,382 B1 | 1/2001 | Dell et al. | 711/170 |
| 6,185,718 B1 | 2/2001 | Dell et al. | |
| 6,198,304 B1 | 3/2001 | Sasaki | |
| 6,215,686 B1 | 4/2001 | Deneroff et al. | 365/52 |
| 6,219,288 B1 | 4/2001 | Braceras et al. | |
| 6,219,760 B1 | 4/2001 | McMinn | |
| 6,233,639 B1 | 5/2001 | Dell et al. | |
| 6,260,127 B1 | 7/2001 | Olarig et al. | 711/167 |
| 6,262,493 B1 | 7/2001 | Garnett | |
| 6,285,172 B1 | 9/2001 | Torbey | |
| 6,292,903 B1 | 9/2001 | Coteus et al. | 713/401 |
| 6,301,636 B1 | 10/2001 | Schultz et al. | 711/108 |
| 6,308,247 B1 | 10/2001 | Ackerman et al. | |
| 6,317,352 B1 | 11/2001 | Halbert et al. | 365/52 |
| 6,321,343 B1 | 11/2001 | Toda | 713/600 |
| 6,338,113 B1 | 1/2002 | Kubo et al. | 711/105 |
| 6,349,390 B1 | 2/2002 | Dell et al. | |
| 6,357,018 B1 | 3/2002 | Stuewe et al. | |
| 6,370,631 B1 | 4/2002 | Dye | 711/170 |
| 6,378,018 B1 | 4/2002 | Tsern et al. | 710/129 |
| 6,381,685 B2 | 4/2002 | Dell et al. | |
| 6,393,512 B1 | 5/2002 | Chen et al. | |
| 6,393,528 B1 | 5/2002 | Arimilli et al. | 711/137 |
| 6,408,398 B1 | 6/2002 | Freker et al. | |
| 6,425,044 B1 | 7/2002 | Jeddeloh | |
| 6,446,174 B1 | 9/2002 | Dow | |
| 6,467,013 B1 | 10/2002 | Nizar | |
| 6,473,836 B1 | 10/2002 | Ikeda | 711/137 |
| 6,477,614 B1 | 11/2002 | Leddige et al. | |
| 6,483,755 B2 | 11/2002 | Leung et al. | 365/189.05 |
| 6,484,271 B1 | 11/2002 | Gray | |
| 6,487,102 B1 | 11/2002 | Halbert et al. | |
| 6,487,627 B1 | 11/2002 | Willke et al. | 710/306 |
| 6,493,250 B2 | 12/2002 | Halbert et al. | 365/63 |
| 6,496,540 B1 | 12/2002 | Widmer | 375/242 |
| 6,496,910 B1 | 12/2002 | Baentsch et al. | 711/165 |
| 6,499,070 B1 | 12/2002 | Whetsel | |
| 6,502,161 B1 | 12/2002 | Perego et al. | 711/5 |
| 6,507,888 B2 | 1/2003 | Wu et al. | 711/105 |
| 6,510,100 B2 | 1/2003 | Grundon et al. | 365/233 |
| 6,513,091 B1 | 1/2003 | Blackmon et al. | 710/316 |
| 6,530,007 B2 | 3/2003 | Olarig | |
| 6,532,525 B1 | 3/2003 | Aleksic et al. | 711/168 |
| 6,546,359 B1 | 4/2003 | Week | 702/186 |
| 6,549,971 B1 | 4/2003 | Cecchi et al. | 710/306 |
| 6,553,450 B1 | 4/2003 | Dodd et al. | 711/105 |
| 6,557,069 B1 | 4/2003 | Drehmel et al. | 710/307 |
| 6,564,329 B1 | 5/2003 | Cheung et al. | 713/322 |
| 6,584,576 B1 | 6/2003 | Co | |
| 6,587,912 B2 | 7/2003 | Leddige | |
| 6,590,827 B2 | 7/2003 | Chang et al. | |
| 6,594,713 B1 | 7/2003 | Fuocco et al. | |
| 6,594,748 B1 | 7/2003 | Lin | |
| 6,601,121 B2 | 7/2003 | Singh et al. | 710/112 |
| 6,601,149 B1 | 7/2003 | Brock et al. | |
| 6,604,180 B2 | 8/2003 | Jeddeloh | |
| 6,611,905 B1 | 8/2003 | Grundon et al. | 711/167 |
| 6,622,217 B2 | 9/2003 | Gharacorloo et al. | 711/141 |
| 6,622,227 B2 | 9/2003 | Zumkehr et al. | |
| 6,625,687 B1 | 9/2003 | Halbert et al. | 711/105 |
| 6,625,702 B2 | 9/2003 | Rentschler et al. | |
| 6,628,538 B2 | 9/2003 | Funaba et al. | 365/63 |
| 6,631,439 B2 | 10/2003 | Saulsbury et al. | 711/104 |
| 6,636,957 B2 | 10/2003 | Stevens et al. | |
| 6,643,745 B1 | 11/2003 | Palanca et al. | |
| 6,671,376 B1 | 12/2003 | Koto et al. | 380/210 |
| 6,678,811 B2 | 1/2004 | Rentschler et al. | 711/167 |
| 6,681,292 B2 | 1/2004 | Creta et al. | |
| 6,684,320 B2 | 1/2004 | Mohamed et al. | |
| 6,697,919 B2 | 2/2004 | Gharachorloo et al. | 711/141 |
| 6,704,842 B1 | 3/2004 | Janakiraman et al. | 711/141 |
| 6,721,185 B2 | 4/2004 | Dong et al. | |
| 6,721,944 B2 | 4/2004 | Chaudhry et al. | 717/154 |
| 6,738,836 B1 | 5/2004 | Kessler et al. | 710/22 |
| 6,741,096 B2 | 5/2004 | Moss | |
| 6,748,518 B1 | 6/2004 | Guthrie et al. | |
| 6,754,762 B1 | 6/2004 | Curley | |
| 6,766,389 B2 | 7/2004 | Hayter et al. | 710/62 |
| 6,775,747 B2 | 8/2004 | Venkatraman | 711/137 |
| 6,791,555 B1 | 9/2004 | Radke et al. | 345/532 |
| 6,799,241 B2 | 9/2004 | Kahn et al. | |
| 6,839,393 B1 | 1/2005 | Sidiropoulos | 375/371 |
| 6,877,076 B1 | 4/2005 | Cho et al. | 711/157 |
| 6,877,078 B2 | 4/2005 | Fujiwara et al. | 711/167 |
| 6,882,082 B2 | 4/2005 | Greeff et al. | |
| 6,889,284 B1 | 5/2005 | Nizar et al. | 710/315 |
| 6,898,726 B1 | 5/2005 | Lee | |

| Patent/Publication | Date | Name | Class |
|---|---|---|---|
| 6,910,146 B2 | 6/2005 | Dow | |
| 6,918,068 B2 | 7/2005 | Vail et al. | |
| 6,938,119 B2 | 8/2005 | Kohn et al. | |
| 6,944,084 B2 | 9/2005 | Wilcox | |
| 6,948,091 B2 | 9/2005 | Bartels et al. | |
| 6,949,950 B2 | 9/2005 | Takahashi et al. | 326/37 |
| 6,965,952 B2 | 11/2005 | Echartea et al. | |
| 6,977,536 B2 | 12/2005 | Chin-Chieh et al. | 327/116 |
| 6,993,612 B2 | 1/2006 | Porterfield | |
| 6,996,639 B2 | 2/2006 | Narad | |
| 7,047,370 B1 | 5/2006 | Jeter, Jr. et al. | |
| 7,047,371 B2 | 5/2006 | Dortu | |
| 7,047,384 B2 | 5/2006 | Bodas et al. | |
| 7,076,700 B2 | 7/2006 | Rieger | |
| 7,103,792 B2 | 9/2006 | Moon | |
| 7,120,743 B2 | 10/2006 | Meyer et al. | |
| 7,133,790 B2 | 11/2006 | Liou | |
| 7,133,972 B2 | 11/2006 | Jeddeloh | |
| 7,177,211 B2 | 2/2007 | Zimmerman | |
| 7,194,593 B2 | 3/2007 | Schnepper | |
| 7,197,594 B2 | 3/2007 | Raz et al. | |
| 7,203,318 B2 | 4/2007 | Collum et al. | |
| 7,206,887 B2 | 4/2007 | Jeddeloh | |
| 7,206,962 B2 | 4/2007 | Deegan | |
| 7,210,059 B2 | 4/2007 | Jeddeloh | |
| 7,216,196 B2 | 5/2007 | Jeddeloh | |
| 7,216,276 B1 | 5/2007 | Azimi et al. | |
| 7,222,213 B2 | 5/2007 | James | |
| 7,227,949 B2 | 6/2007 | Heegard et al. | |
| 7,240,145 B2 | 7/2007 | Holman | |
| 7,260,685 B2 | 8/2007 | Lee et al. | |
| 7,266,634 B2 | 9/2007 | Ware et al. | |
| 7,296,129 B2 | 11/2007 | Gower et al. | |
| 7,304,905 B2 * | 12/2007 | Hsu et al. | 365/212 |
| 7,313,583 B2 | 12/2007 | Porten et al. | |
| 7,319,340 B2 * | 1/2008 | Jeddeloh et al. | 324/763 |
| 7,321,979 B2 | 1/2008 | Lee | |
| 7,328,381 B2 * | 2/2008 | Jeddeloh et al. | 714/718 |
| 7,353,316 B2 | 4/2008 | Erdmann | |
| 7,363,419 B2 | 4/2008 | Cronin et al. | |
| 7,363,436 B1 | 4/2008 | Yeh et al. | |
| 7,370,134 B2 | 5/2008 | Jeddeloh | |
| 7,386,575 B2 | 6/2008 | Bashant et al. | |
| 7,418,526 B2 | 8/2008 | Jeddeloh | |
| 7,421,525 B2 | 9/2008 | Polzin et al. | |
| 7,433,258 B2 | 10/2008 | Rao et al. | |
| 2001/0000822 A1 | 5/2001 | Dell et al. | 711/170 |
| 2001/0003839 A1 | 6/2001 | Kondo | 711/144 |
| 2001/0029566 A1 | 10/2001 | Shin | |
| 2002/0019926 A1 | 2/2002 | Huppenthal et al. | 712/15 |
| 2002/0038405 A1 | 3/2002 | Leddige et al. | 711/115 |
| 2002/0059439 A1 | 5/2002 | Arroyo et al. | |
| 2002/0083255 A1 | 6/2002 | Greeff et al. | 710/305 |
| 2002/0103988 A1 | 8/2002 | Dornier | 712/38 |
| 2002/0112119 A1 | 8/2002 | Halbert et al. | 711/115 |
| 2002/0112194 A1 | 8/2002 | Uzelac | 713/500 |
| 2002/0124195 A1 | 9/2002 | Nizar | 713/320 |
| 2002/0124201 A1 | 9/2002 | Edwards et al. | |
| 2002/0147898 A1 | 10/2002 | Rentschler et al. | 711/170 |
| 2002/0174274 A1 | 11/2002 | Wu et al. | 710/100 |
| 2003/0009632 A1 | 1/2003 | Arimilli et al. | |
| 2003/0028701 A1 | 2/2003 | Rao et al. | |
| 2003/0033364 A1 | 2/2003 | Garnett et al. | 709/203 |
| 2003/0051055 A1 | 3/2003 | Parrella et al. | |
| 2003/0056183 A1 | 3/2003 | Kobayashi | |
| 2003/0084309 A1 | 5/2003 | Kohn | 713/189 |
| 2003/0090879 A1 | 5/2003 | Doblar et al. | 361/728 |
| 2003/0105938 A1 | 6/2003 | Cooksey et al. | |
| 2003/0118044 A1 | 6/2003 | Blanc et al. | |
| 2003/0126354 A1 | 7/2003 | Kahn et al. | |
| 2003/0126363 A1 | 7/2003 | David | |
| 2003/0223303 A1 | 12/2003 | Lamb et al. | 365/230.06 |
| 2003/0229770 A1 | 12/2003 | Jeddeloh | |
| 2003/0235222 A1 | 12/2003 | Bridges et al. | |
| 2003/0236959 A1 | 12/2003 | Johnson et al. | 711/167 |
| 2004/0006674 A1 | 1/2004 | Hargis et al. | 711/156 |
| 2004/0015650 A1 | 1/2004 | Zumkehr et al. | |
| 2004/0049723 A1 | 3/2004 | Obara | 714/729 |
| 2004/0078615 A1 | 4/2004 | Martin et al. | |
| 2004/0098546 A1 | 5/2004 | Bashant et al. | |
| 2004/0098549 A1 | 5/2004 | Dorst | |
| 2004/0117588 A1 | 6/2004 | Arimilli et al. | 711/203 |
| 2004/0123222 A1 | 6/2004 | Widmer | |
| 2004/0128474 A1 | 7/2004 | Vorbach | 712/10 |
| 2004/0148482 A1 | 7/2004 | Grundy et al. | |
| 2004/0160832 A1 | 8/2004 | Janzen et al. | |
| 2004/0163028 A1 | 8/2004 | Olarig | |
| 2004/0165609 A1 | 8/2004 | Herbst et al. | |
| 2004/0199363 A1 | 10/2004 | Bohizic et al. | |
| 2004/0205433 A1 | 10/2004 | Gower et al. | |
| 2004/0230718 A1 | 11/2004 | Polzin et al. | 710/22 |
| 2004/0246767 A1 | 12/2004 | Vogt | 365/154 |
| 2004/0250153 A1 | 12/2004 | Vogt | 713/500 |
| 2004/0260909 A1 | 12/2004 | Lee et al. | |
| 2004/0260957 A1 | 12/2004 | Jeddeloh et al. | |
| 2005/0023560 A1 | 2/2005 | Ahn et al. | 257/200 |
| 2005/0027941 A1 | 2/2005 | Wang et al. | |
| 2005/0044305 A1 | 2/2005 | Jakobs et al. | |
| 2005/0050237 A1 | 3/2005 | Jeddeloh et al. | 710/10 |
| 2005/0050255 A1 | 3/2005 | Jeddeloh | 710/317 |
| 2005/0066136 A1 | 3/2005 | Schnepper | 711/154 |
| 2005/0071542 A1 | 3/2005 | Weber et al. | |
| 2005/0071707 A1 | 3/2005 | Hampel | |
| 2005/0078506 A1 | 4/2005 | Rao et al. | |
| 2005/0080581 A1 | 4/2005 | Zimmerman et al. | 702/117 |
| 2005/0081129 A1 | 4/2005 | Shah et al. | |
| 2005/0086424 A1 | 4/2005 | Oh et al. | |
| 2005/0086441 A1 | 4/2005 | Meyer et al. | |
| 2005/0097249 A1 | 5/2005 | Oberlin et al. | |
| 2005/0105350 A1 | 5/2005 | Zimmerman et al. | |
| 2005/0120157 A1 | 6/2005 | Chen et al. | 710/313 |
| 2005/0125702 A1 | 6/2005 | Huang et al. | |
| 2005/0125703 A1 | 6/2005 | Lefurgy et al. | |
| 2005/0138246 A1 | 6/2005 | Chen et al. | |
| 2005/0138267 A1 | 6/2005 | Bains et al. | |
| 2005/0144399 A1 | 6/2005 | Hosomi | 711/145 |
| 2005/0149665 A1 | 7/2005 | Wolrich et al. | |
| 2005/0166006 A1 | 7/2005 | Talbot et al. | |
| 2005/0177677 A1 | 8/2005 | Jeddeloh | |
| 2005/0177690 A1 | 8/2005 | LaBerge | 711/154 |
| 2005/0204216 A1 | 9/2005 | Daily et al. | 714/724 |
| 2005/0216678 A1 | 9/2005 | Jeddeloh | |
| 2005/0220097 A1 | 10/2005 | Swami et al. | |
| 2005/0223196 A1 | 10/2005 | Knowles | |
| 2005/0229132 A1 | 10/2005 | Butt et al. | 716/10 |
| 2005/0248997 A1 | 11/2005 | Lee | |
| 2005/0257005 A1 | 11/2005 | Jeddeloh | |
| 2005/0259496 A1 | 11/2005 | Hsu et al. | 365/226 |
| 2005/0289292 A1 * | 12/2005 | Morrow et al. | 711/105 |
| 2005/0289377 A1 | 12/2005 | Luong | |
| 2006/0036826 A1 | 2/2006 | Dell et al. | |
| 2006/0036827 A1 | 2/2006 | Dell et al. | |
| 2006/0080584 A1 | 4/2006 | Hartnett et al. | |
| 2006/0085602 A1 | 4/2006 | Huggahalli et al. | |
| 2006/0095592 A1 | 5/2006 | Borkenhagen | |
| 2006/0095679 A1 | 5/2006 | Edirisooriya | |
| 2006/0107175 A1 | 5/2006 | Dell et al. | |
| 2006/0112238 A1 | 5/2006 | Jamil et al. | |
| 2006/0161733 A1 | 7/2006 | Beckett et al. | |
| 2006/0162882 A1 | 7/2006 | Ohara et al. | |
| 2006/0168407 A1 | 7/2006 | Stern | |
| 2006/0179208 A1 | 8/2006 | Jeddeloh | |
| 2006/0190674 A1 | 8/2006 | Poechmueller | |
| 2006/0195631 A1 | 8/2006 | Rajamani | |
| 2006/0206742 A1 | 9/2006 | James | |
| 2006/0212666 A1 | 9/2006 | Jeddeloh | |

| | | | |
|---|---|---|---|
| 2006/0224764 A1 | 10/2006 | Shinohara et al. | |
| 2006/0277365 A1 | 12/2006 | Pong | |
| 2006/0288172 A1 | 12/2006 | Lee et al. | |
| 2007/0005922 A1 | 1/2007 | Swaminathan et al. | |
| 2007/0025304 A1 | 2/2007 | Leelahakriengkrai et al. | |
| 2007/0038907 A1 | 2/2007 | Jeddeloh et al. | |
| 2007/0067382 A1 | 3/2007 | Sun | |
| 2007/0083701 A1 | 4/2007 | Kapil | |
| 2008/0043808 A1* | 2/2008 | Hsu et al. | 374/141 |
| 2008/0162807 A1 | 7/2008 | Rothman et al. | |
| 2008/0222379 A1 | 9/2008 | Jeddeloh | |

FOREIGN PATENT DOCUMENTS

| | | |
|---|---|---|
| EP | 0470734 A1 | 2/1992 |
| EP | 0899743 A2 | 6/1998 |
| EP | 1429340 A2 | 6/2004 |
| GB | 2396711 A | 6/2004 |
| JP | 59153353 | 9/1984 |
| JP | 59153353 A | 9/1984 |
| JP | 0114140 A | 6/1986 |
| JP | 0432614 | 11/1992 |
| JP | 10011971 | 1/1998 |
| JP | 2004139552 A | 5/2004 |
| JP | 2008003711 A | 1/2008 |
| WO | 9621188 | 7/1996 |
| WO | 9812651 | 3/1998 |
| WO | 0223353 A2 | 3/2002 |
| WO | WO2005038660 | 4/2005 |
| WO | 2007109888 | 10/2007 |

OTHER PUBLICATIONS

PCT International Search Report PCT/EP2007/057916. Mailed Dec. 14, 2007.
Boudon, et al., "Novel Bus Reconfiguration Scheme With Spare Lines", IBM Technical Disclosure Bulletin, May 1987, vol. 29, No. 12, pp. 1-3.
NB940259 (IBM Technical Disclosure Bulletin, Feb. 1994; vol. 37; pp. 59-64).
Singh, S., et al., "Bus Sparing for Fault-Tolerant System Design", IBM Technical Disclosure Bulletin, Dec. 1991, vol. 34, No. 71, pp. 117-118.
U.S. Appl. No. 11/419,586, filed May 22, 2006. Robert Tremaine. "Systems and Methods for Providing Remote Pre-Fetch Buffers".
Wikipedia, Serial Communications, [online], [retrieved Apr. 10, 2007 from the Internet], http://en.wikipedia.org/wiki/Serial_communications, 3 pages.
International Search Report, International Application No. PCT/EP2007/054929, International Publication No. WO 2007/135144 A1, received Mar. 21, 2008.
IEEE, "IEEE Standard Test Access Port and Boundary-Scan Architecture", Jul. 23, 2001, IEEE Std 1149-1-2001, pp. 11-13.
Rosenberg, "Dictionary of Computers, Information Processing & Telecommuications", Second Edition, John Wiley & Sons, Inc. 1987. 3 pgs.
Sivencrona et al.; "RedCAN™: Simulations of two Fault Recovery Algorithms for CAN;" Proceedings for the 10th IEEE Pacific Rim International Symposium on Dependable Computing (PRDC'04); 2005.
Jungjoon Kim et al.; "Performance and Architecture Features of Segmented Multiple Bus System;" IEEE Computer Society; 1999 International Conference on Parallel Processing (ICPP '99).
Ghoneima et al.; "Optimum Positioning of Interleaved Repeaters in Bidirectional Buses;" IEEE Transactions on Computer-Aided Design of Integrated Circuits and Systems, vol. 25, No. 3, Mar. 2005, pp. 461-469.
Seceleanu et al.; "Segment Arbiter as Action System;" IEEE 2003 pp. 249-252.
Understanding System Memory and CPU Speeds: A Layman's Guide to the Front Side Bus (FSB), [online]; [retrieved on Feb. 23, 2006]; retrieved from the Internet http://www.directron.com/fsbguide.html.
JEDEC Solid State Technology Association, "JEDEC Standard: DDR2 SDRAM Specification", Jan. 2004, JEDEC, Revision JESD79-2A, p. 10.
Brown, et al "Compiler-Based I/O Prefetching for Out-of-Core Applications", ACM Transactions on Computer Systems, vol. 19, No. 2, May 2001, pp. 111-170.
Wang et al., "Guided Region Prefetching: A Cooperative Hardware/Software Approach", pp. 388-398.
Natarajan, et al., "A Study of Performance Impact of Memory Controller Features in Multi-Processor Server Environment", pp. 80-87.
Nilsen, "High-Level Dynamic Memory Management for Object-Oriented Real-Time Systems", pp. 86-93.
Massoud Pedram, "Power Minimization in IC Design Principles and Applications", ACM Transactions on Design Automation of Electronic Systems vol. 1, No. 1, Jan. 1996, pp. 3-56.
P.R. Panda, "Data and Memory Optimization Techniques For Embedded Systems", ACM Transactions on Design Automation of Electronic Systems, vol. 6, No. 2, Apr. 2001, pp. 149-206.
Luca Benini, et al., "System-Level Powers Optimization: Techniques an Tools", ACM Transactions on Design Automation of Electronic Systems, vol. 5, No. 2, Apr. 2000, pp. 115-192.
Joe Jeddeloh, Fully Buffered DIMM (FB-DIMM), XP002490174, Advanced Systems Technology, Micron Technology, Inc. Apr. 16, 2008, 32 pages.
Timothy J. Dell, "The RAS Implications of DIMM Connector Failure Rates in Large, Highly Available Server Systems", The 53rd IEEE Holm Conference on Electrical Contacts, IEEE, Sep. 16-19, 2007, pp. 256-261.
"Using Dual and Mappable Spare Bus", XP000433763, IBM Technical Disclosure Bulletin, vol. 37, No. 2B, IBM Copr., NY, US, Feb. 1, 1994, pp. 59-63.
"Novel Bus Reconfiguration Scheme With Spare Lines", XP000676205, IBM Technical Disclosure Bulletin, vol. 29, No. 12, IBM Corp., NY, US, May 12, 1987, pp. 5590-5593.
European Search Report, European Patent Application 05106700.7, received Aug. 11, 2008.
International Search Report, International Patent Application No. PCT/US07/75944, mailed Sep. 23, 2008, 3 pages.
European Search Report, European Patent Application No. 05106701.5, mailed Oct. 7, 2008, 5 pages.
European Search Report, European Patent Application No. 05109837.4, mailed Oct. 7, 2008, 5 pages.
PCT Search Report. PCT/EP2007/057915. Mailed Nov. 7, 2007.
Yang, Q.; Bhuyan, L.N., "Analysis of packet-switched multiple-bus multiprocessor systems," Computers, IEEE Transactions on, vol. 40, No. 3, pp. 352-357, Mar. 1991.
Li, P; Martinez, J.; Tang, J.; Priore, S.,; Hubbard, K.; Jie Xue; Poh, E.; Ong MeiLin; Chok KengYin; Hallmark, C.; Mendez, D.; "Development and evaluation of a high performance fine pitch SODIMM socket package." Electronic Components and Technology Conference, 2004. Proceedings. 54th, vol. 1, pp. 1161-1166, Jun. 1-4, 2004.
Nilsen, "High-Level Dynamic Memory Management for Object-Oriented Real-Time Systems", Jan. 1, 1996, pp. 86-93.
Wang, et al., "Guided Region Prefetching: A Cooperative Hardware/Software Approach", Jun. 2003, pp. 388-398.
Natarajan, et al., "A Study of Performance Impact of Memory Controller-Features in Multi-Processor Server Environment", WMPI, Jun. 2004, pp. 80-87.

* cited by examiner

|  | GROUP 0 DEVICE | ... | GROUP 1 DEVICE | FUNCTIONAL GROUP 0 | FUNCTIONAL GROUP 1 |
| --- | --- | --- | --- | --- | --- |
| PERMISSION LEVEL n | | | | | |
| PERMISSION LEVEL 4 | | | | | |
| PERMISSION LEVEL 3 | | | | | |
| PERMISSION LEVEL 2 | | | | | |
| PERMISSION LEVEL 1 | | | | | |
| PERMISSION LEVEL 0 | | | | | |

FIG. 8

SYSTEMS AND METHODS FOR PROVIDING DISTRIBUTED AUTONOMOUS POWER MANAGEMENT IN A MEMORY SYSTEM

BACKGROUND OF THE INVENTION

This invention relates generally to computer memory, and more particularly to providing distributed autonomous power management in a memory system.

Contemporary high performance computing main memory systems are generally composed of one or more dynamic random access memory (DRAM) devices, which are connected to one or more processors via one or more memory control elements. Overall computer system performance is affected by each of the key elements of the computer structure, including the performance/structure of the processor(s), any memory cache(s), the input/output (I/O) subsystem(s), the efficiency of the memory control function(s), the main memory device(s), and the type and structure of the memory interconnect interface(s).

Extensive research and development efforts are invested by the industry, on an ongoing basis, to create improved and/or innovative solutions to maximizing overall system performance and density by improving the memory system/sub-system design and/or structure. High-availability systems present further challenges as related to overall system reliability due to customer expectations that new computer systems will markedly surpass existing systems in regard to mean-time-between-failure (MTBF), in addition to offering additional functions, increased performance, increased storage, lower operating costs, etc. Other frequent customer requirements further exacerbate the memory system design challenges, and include such items as ease of upgrade and reduced system environmental impact (such as space, power and cooling).

FIG. 1 relates to U.S. Pat. No. 5,513,135 to Dell et al., of common assignment herewith, and depicts an early synchronous memory module. The memory module depicted in FIG. 1 is a dual in-line memory module (DIMM). This module is composed of synchronous DRAMs 8, buffer devices 12, an optimized pinout, and an interconnect and capacitive decoupling method to facilitate high performance operation. The patent also describes the use of clock re-drive on the module, using such devices as phase-locked loops (PLLs).

FIG. 2 relates to U.S. Pat. No. 6,173,382 to Dell et al., of common assignment herewith, and depicts a computer system 10 which includes a synchronous memory module 20 that is directly (i.e. point-to-point) connected to a memory controller 14 via a bus 40, and which further includes logic circuitry 24 (such as an application specific integrated circuit, or "ASIC") that buffers, registers or otherwise acts on the address, data and control information that is received from the memory controller 14. The memory module 20 can be programmed to operate in a plurality of selectable or programmable modes by way of an independent bus, such as an inter-integrated circuit (I2C) control bus 34, either as part of the memory initialization process or during normal operation. When utilized in applications requiring more than a single memory module connected directly to a memory controller, the patent notes that the resulting stubs can be minimized through the use of field-effect transistor (FET) switches to electrically disconnect modules from the bus.

Relative to U.S. Pat. No. 5,513,135, U.S. Pat. No. 6,173,382 further demonstrates the capability of integrating all of the defined functions (address, command, data, presence detect, etc) into a single device. The integration of functions is a common industry practice that is enabled by technology improvements and, in this case, enables additional module density and/or functionality.

FIG. 3, from U.S. Pat. No. 6,510,100 to Grundon et al., of common assignment herewith, depicts a simplified diagram and description of a memory system 10 that includes up to four registered DIMMs 40 on a traditional multi-drop stub bus. The subsystem includes a memory controller 20, an external clock buffer 30, registered DIMMs 40, an address bus 50, a control bus 60 and a data bus 70 with terminators 95 on the address bus 50 and the data bus 70. Although only a single memory channel is shown in FIG. 3, systems produced with these modules often included more than one discrete memory channel from the memory controller, with each of the memory channels operated singly (when a single channel was populated with modules) or in parallel (when two or more channels where populated with modules) to achieve the desired system functionality and/or performance.

FIG. 4, from U.S. Pat. No. 6,587,912 to Bonella et al., depicts a synchronous memory module 210 and system structure in which the repeater hubs 320 include local re-drive of the address, command and data to the local memory devices 301 and 302 via buses 321 and 322; generation of a local clock (as described in other figures and the patent text); and the re-driving of the appropriate memory interface signals to the next module or component in the system via bus 300.

FIG. 5 depicts a contemporary system composed of an integrated processor chip 500, which contains one or more processor elements and an integrated memory controller 510. In the configuration depicted in FIG. 5, multiple independent cascade interconnected memory interface busses 506 are logically aggregated together to operate in unison to support a single independent access request at a higher bandwidth with data and error detection/correction information distributed or "striped" across the parallel busses and associated devices. The memory controller 510 attaches to four narrow/high speed point-to-point memory busses 506, with each bus 506 connecting one of the several unique memory controller interface channels to a cascade interconnected memory subsystem 503 (or memory module) which includes at least a hub device 504 and one or more memory devices 509. Some systems further enable operations when a subset of the memory busses 506 are populated with memory subsystems 503. In this case, the one or more populated memory busses 508 may operate in unison to support a single access request.

FIG. 6 depicts a block diagram of a memory hub device 504 including a link interface 604 for providing the means to re-synchronize, translate and re-drive high speed memory access information to associated DRAM devices 509 and/or to re-drive the information downstream on memory bus 506 as applicable based on the memory system protocol. The information is received by the link interface 604 from an upstream memory hub device 504 or from a memory controller 510 (directly or via an upstream memory hub device controller 504) via the memory bus 506. The memory device data interface 615 manages the technology-specific data interface with the memory devices 509 and controls the bi-directional memory data bus 608. The memory hub control 613 responds to access request packets by responsively driving the memory device 509 technology-specific address and control bus 614 (for memory devices in Rank 0 501) or address and control bus 614' (for memory devices in Rank 1 616) and directing the read data flow 607 and write data flow 610 selectors. The link interface 604 decodes the packets and directs the address and command information directed to the local hub device 504 to the memory hub control 613. Memory write data from the link interface 604 can be temporarily stored in the write data queue 611 or directly driven to the memory devices 509 via the write data flow selector 610 and internal bus 612, and then sent via internal bus 609 and memory device data interface 615 to memory device data bus 608. Memory read data from memory device(s) 509 can be queued in the read data queue 606 or directly transferred to the link interface 604 via internal bus 605 and read data selector 607, to be transmitted on the upstream bus 506 as a read reply packet.

Various techniques are used to manage the power utilization in computing systems. For example, the Advanced Configuration and Power Interface (ACPI) specification is widely supported in commodity computing systems to manage power consumption, and is most prevalently engaged in power sensitive applications (e.g., portable computers). However, this and other prior art do not specifically support the memory system power management requirements in server computers, where memory system scale and sophistication in these computers demands real-time power management without requiring software intervention. A significant amount of the power in a computer is used by the distributed devices that comprise the main memory system, and power management is centrally controlled by software control of the memory controller. However, the power management capabilities of the distributed devices must be defined when the system is designed or directly support the ACPI standard, and the specific means for sensing and controlling the devices must exist in all the interfaces and protocols between the device and the central controller.

What is needed, is the ability to impress power management rules upon a distribution of devices by a central control, without the requirement of having the specific details of power management activity known at the point of central control (e.g., at the memory controller). Moreover, sufficient granularity of control and manual override is needed in order to function in all memory system implementations, particularly where power consumption and thermal load need to be managed autonomously, and according to prescribed absolute power consumption and/or thermal load limits.

BRIEF SUMMARY OF THE INVENTION

Embodiments include a memory system for storing and retrieving data for a processing system. The memory system includes a memory controller for receiving and responding to memory access requests, a memory bus in communication with the memory controller, a plurality of memory devices, and a control unit external to the memory controller. The memory devices are in communication with the memory controller via the memory bus, with one or more of the memory devices being associated with a group. The control unit autonomously manages power within and for the group of memory devices.

Other embodiments include a memory system for storing and retrieving data for a processing system. The memory system includes a memory controller for receiving and responding to memory access requests, a plurality of memory devices, a memory bus in communication with the memory controller, and a memory hub device in communication with the memory bus. The memory hub device includes a memory interface for transferring data and control information between the memory hub device and the memory controller via the memory bus. The memory hub device also includes a memory device interface for communicating with the memory devices and a control unit for autonomously managing power within and for the memory devices.

Further embodiments include a method for managing power in a memory system. The method includes receiving a target permission level for a group of memory devices. The target permission level indicates limits for one or more of power consumption, temperature and activity level. One or more of power consumption, temperature and activity level of the group of memory devices is monitored. A power savings means is invoked if one or more of the power consumption has exceeded it associated limit, the temperature has exceeded its associated limit, and the activity level is below its associated limit.

Further embodiments include a memory subsystem. The memory subsystem includes plurality of memory devices and one or more memory hub devices in communication with a memory bus. Each memory hub device includes a memory interface, a memory device interface, and a control unit. The memory interface transfers data and control information between the memory hub device and a memory controller via the memory bus. The memory device interface communicates with the memory devices. The control unit autonomously manages power within and for the memory devices.

Still further embodiments include a memory hub device. The memory hub device includes a memory interface, a memory device interface and a control unit. The memory interface transfers data and control information between the memory hub device and a memory controller via a memory bus. The memory device interface communicates with memory devices attached to the memory hub device. The control unit autonomously manages power within and for the memory devices.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring now to the drawings wherein like elements are numbered alike in the several FIGURES:

FIG. 8 depicts a logical permission hierarchical framework that may be implemented by exemplary embodiments.

DETAILED DESCRIPTION OF EXEMPLARY EMBODIMENTS

Figure 1:
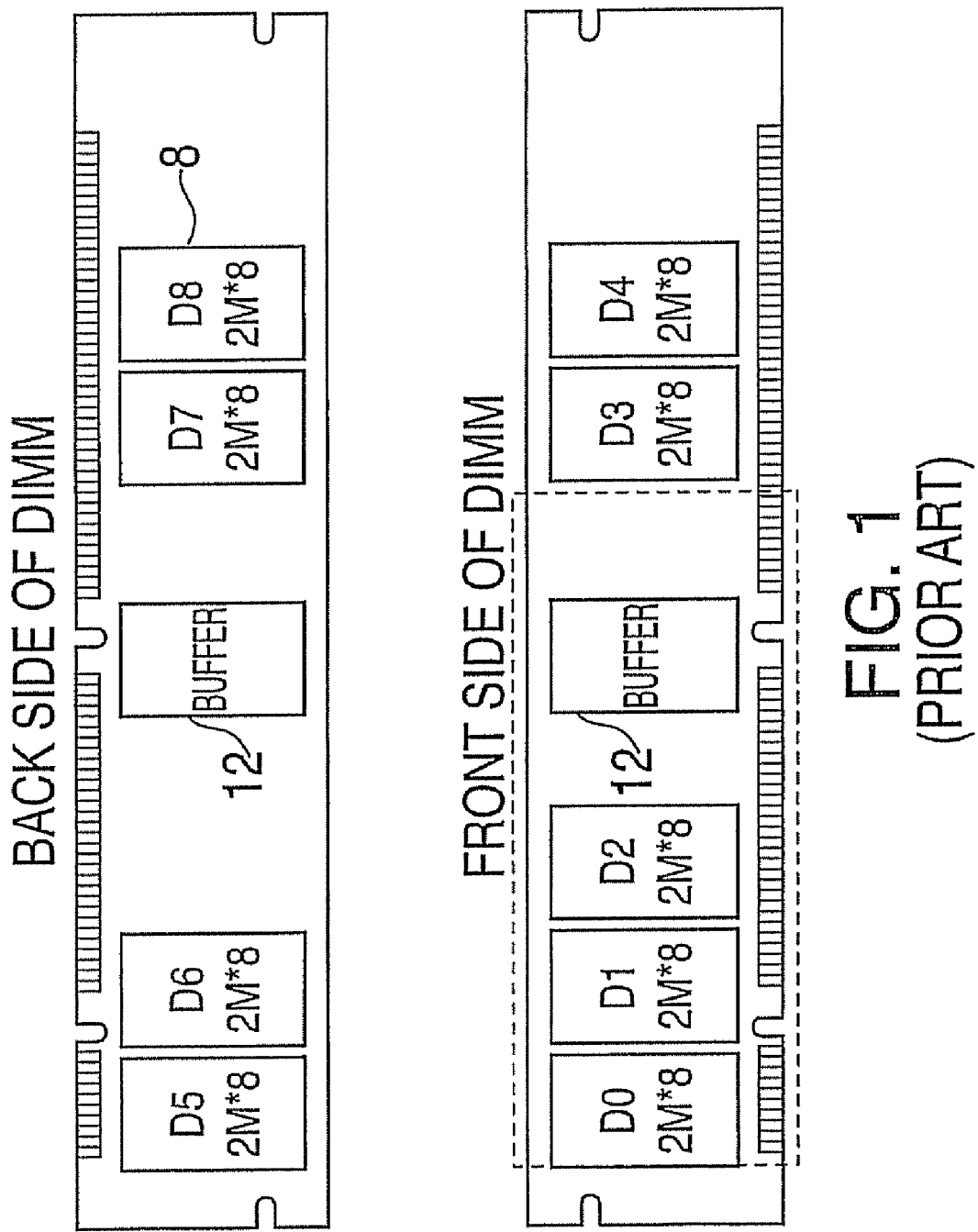
FIG. 1 depicts an exemplary early synchronous memory module.
Figure 2:
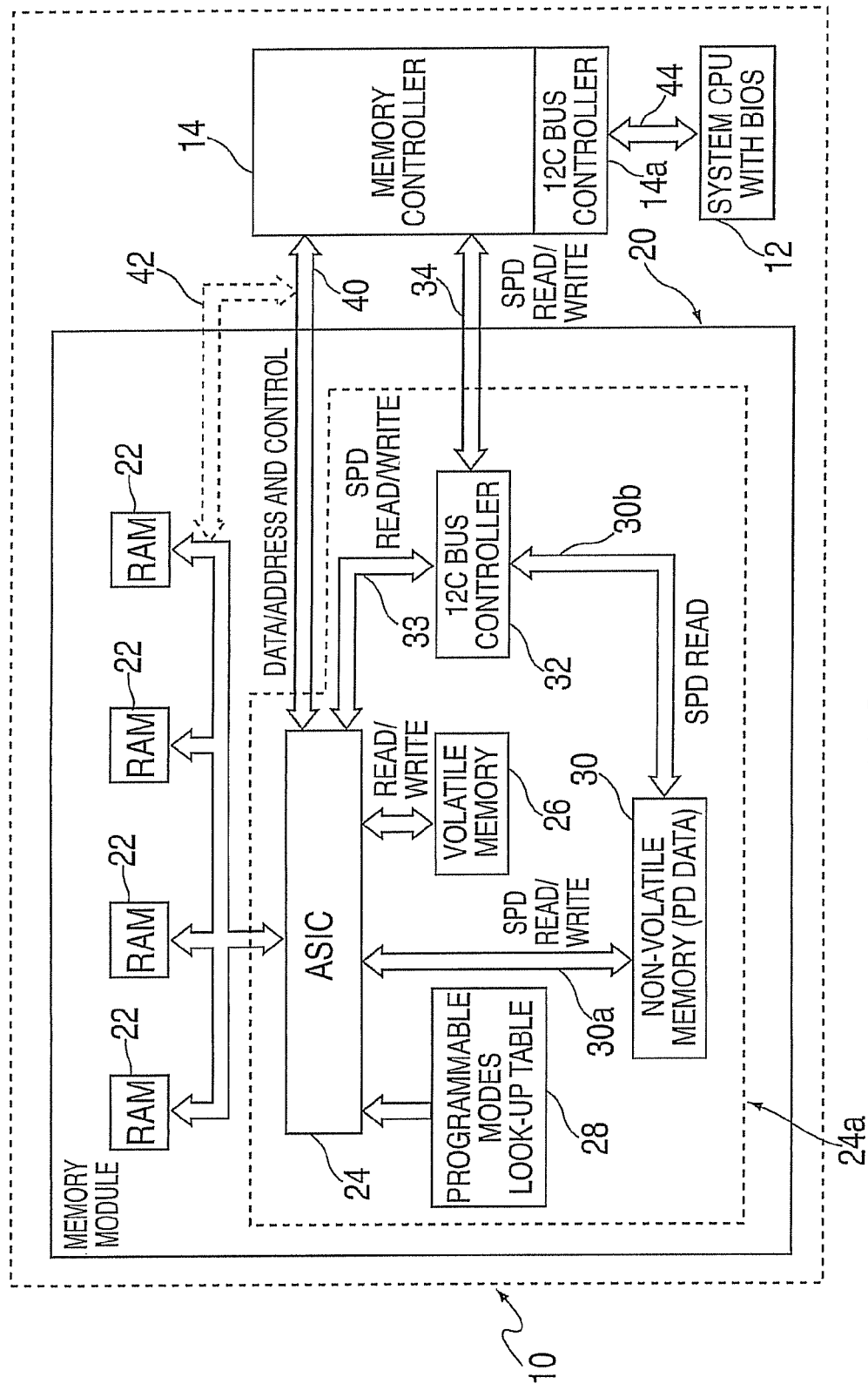
FIG. 2 depicts an exemplary computer system with a fully buffered synchronous memory module that is directly connected to a memory controller.
Figure 3:
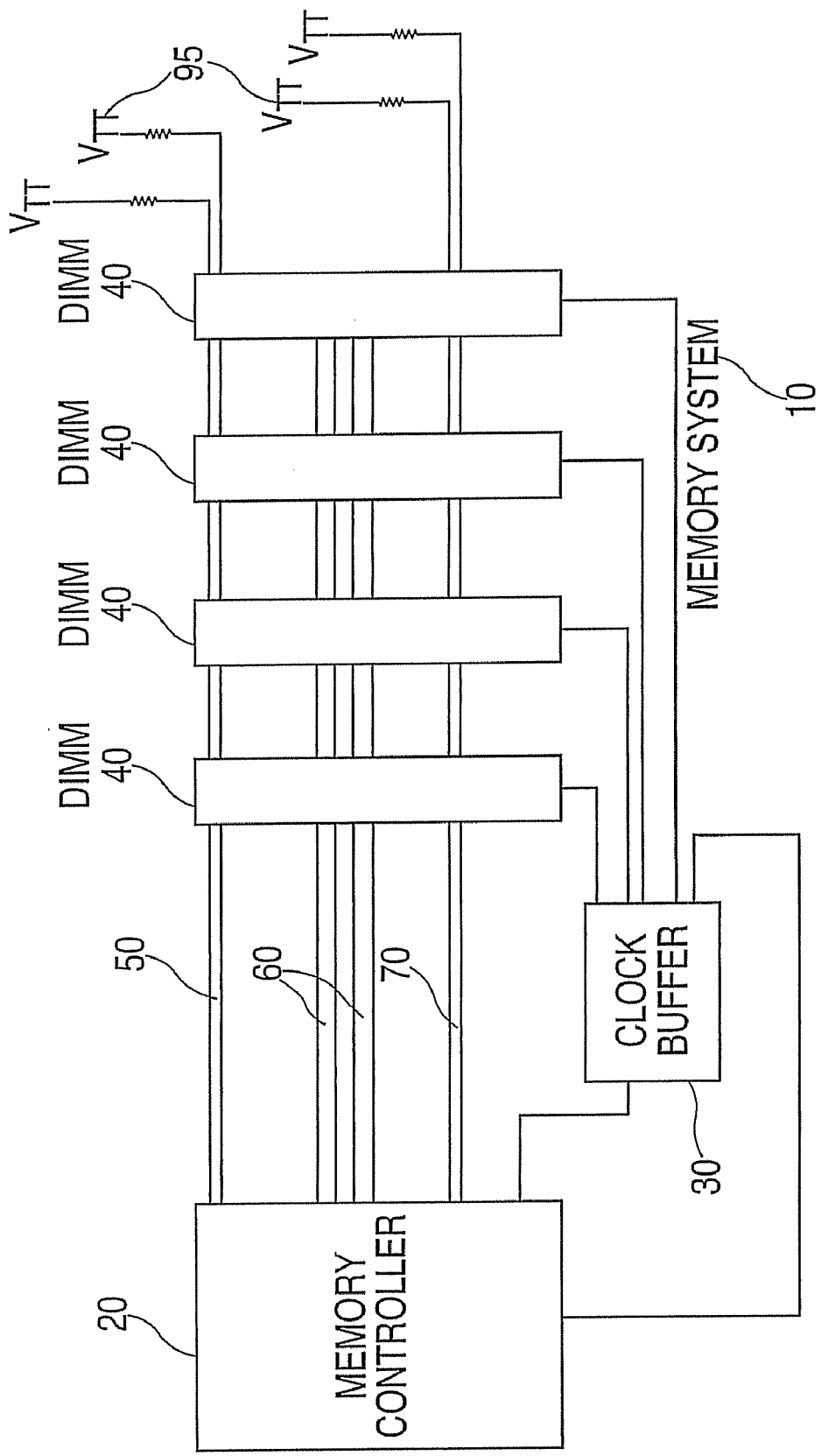
FIG. 3 depicts an exemplary memory system, shown with a single, traditional multi-drop stub bus.
Figure 4:
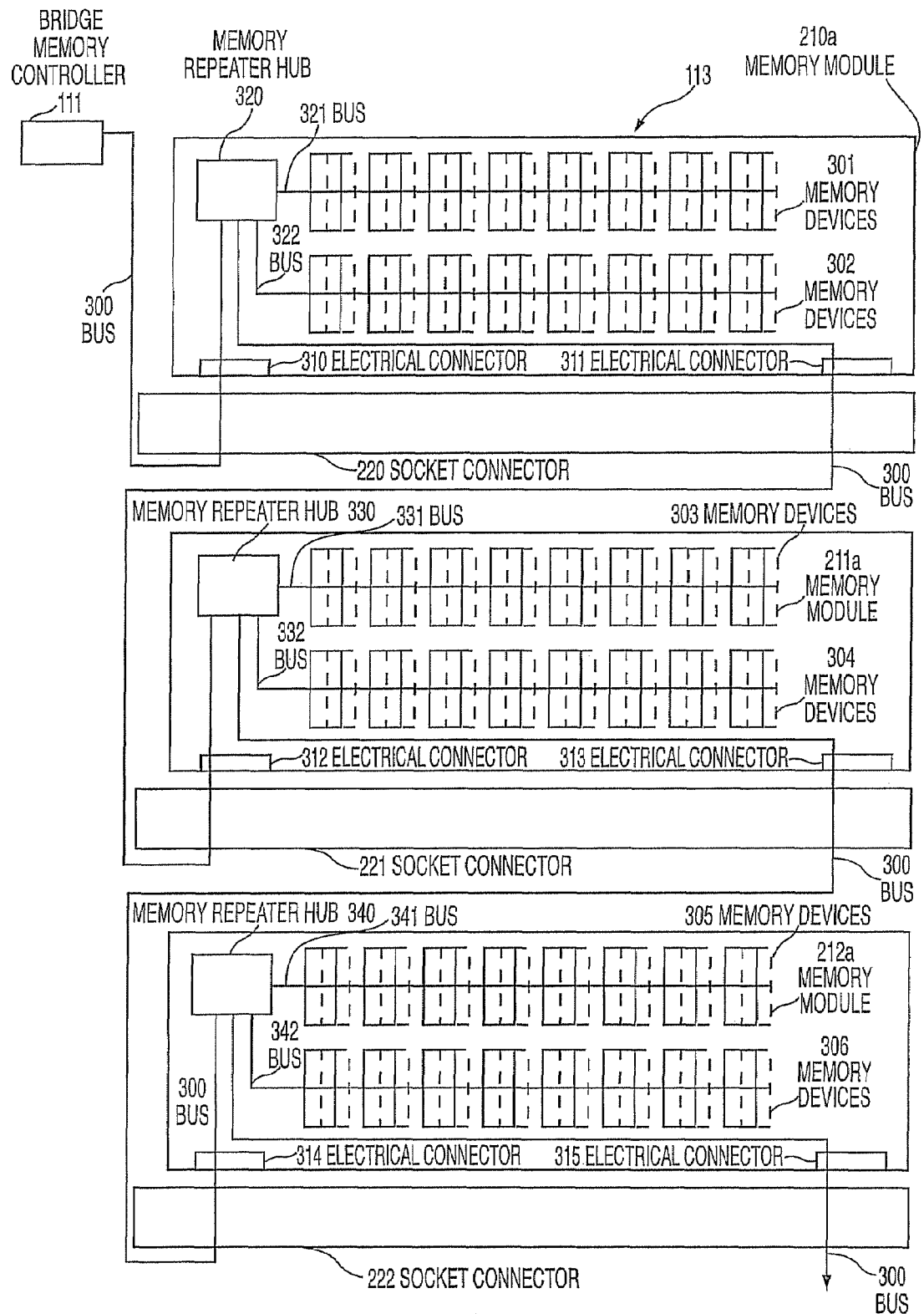
FIG. 4 depicts a fully buffered synchronous memory module and system structure, where the fully buffered synchronous memory module includes a repeater function.
Figure 5:
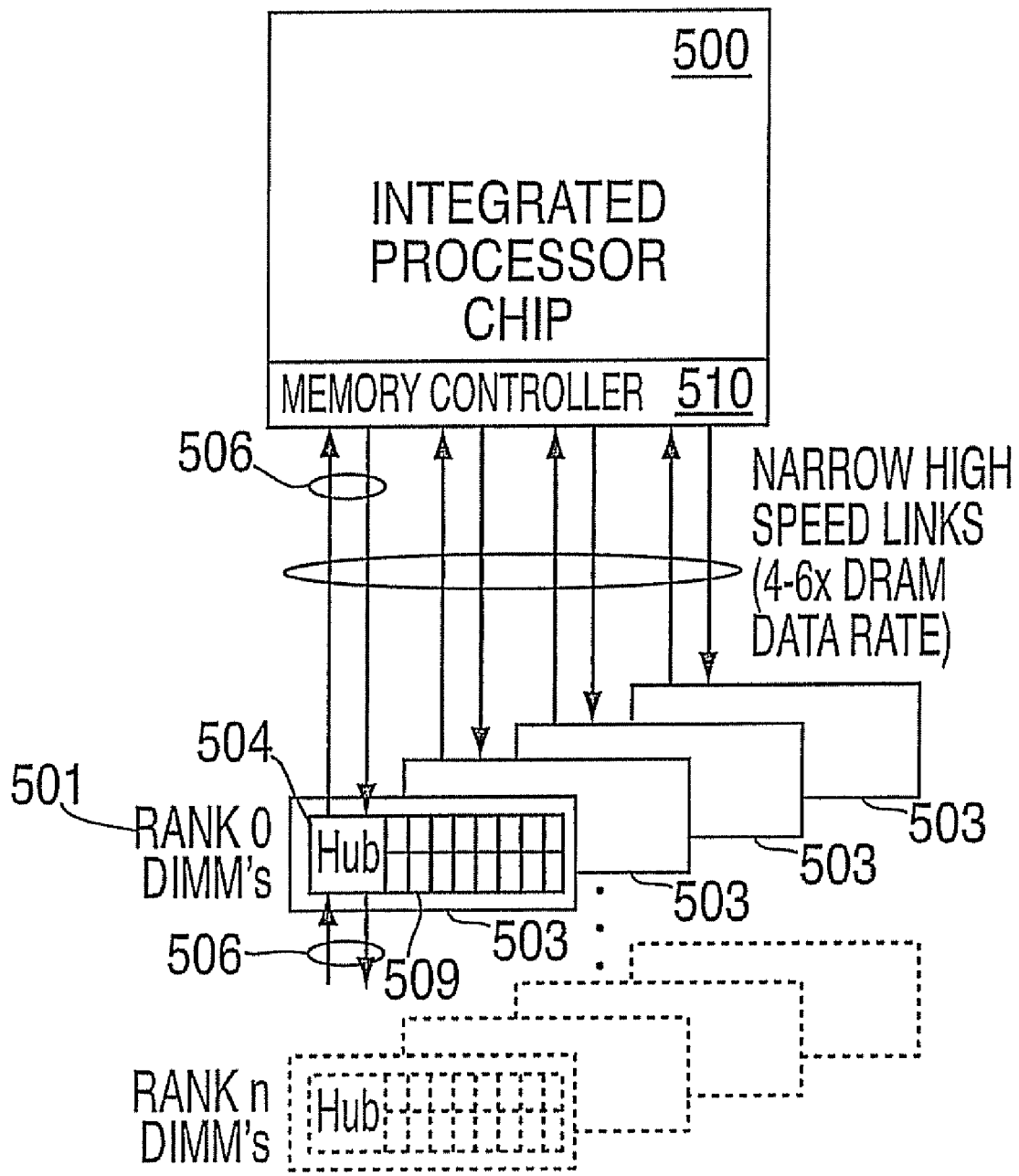
FIG. 5 depicts a block diagram of a computer memory system which includes multiple independent cascade interconnect memory interface busses that operate in unison to support a single data access request.

Exemplary embodiments provide a memory system having integrated power management, wherein a framework of rules is established that permit the one or memory subsystems comprising the memory system to autonomously manage local power consumption within the rules and framework established for the memory system. The framework includes of set of power management permission levels associated with the memory subsystem(s) and/or groups of devices within the subsystem(s), in addition to rules for operation within and between the permission levels. The permission levels are configured in the memory controller, hub devices and/or memory devices by a central controller. Moreover, specific power consumption and/or thermal load limits can be associated with the permission levels to govern operation while maintaining power usage within the prescribed limits. The framework is hardware independent, such that specific power management functions can be implemented or introduced at anytime within devices and defined to autonomously operate within the prescribed power management permission level(s). Further, this generalized framework allows for having predetermined power management suites that are optimized for different runtime environments or system applications that employ common memory components and/or control software.

As used herein, the term "permission level" refers to one or more physical system power management facilities, or modes, associated with a device, group of devices or other functional unit. Physical system power management facilities may include, but are not limited to: powering down the device, putting the device in sleep mode, putting the device in a low power mode, putting the device in a fall performance mode, putting the device in self-refresh mode, clock gating, increased command spacing, frequency management (e.g., reduced frequency of operation), and priority management (e.g., delaying lower priority commands). As used herein, the term "device group" refers to the one or more devices, such as a "rank" of memory devices, that serve a common function and are grouped together to enable the devices to shift, as a unit, between various permission levels. As used herein, the term "functional state" refers to higher level system operations including the group of one or more permission levels (e.g. the performance level(s)) in which a device group is allowed to operate via local control. As used herein, the term "functional group" refers to the one or more functional states within which device groups may operate. One or more functional groups may exist for any given power managed system to comprehend the varying needs of different system applications, different runtime environments, etc.

In exemplary embodiments, power is managed in two dimensions. The first dimension is functional state (and associated costs, performance, and quality of service); and the second dimension is absolute power consumption or thermal load. Multiple permission levels may pertain to a single functional state and different power and/or thermal loads may pertain to permission levels within a functional state. Specific permissions may be established for different components, regions, ranks or types of memory. In the exemplary embodiment, permission levels are an ordered set of numeric codes (i.e., 0, 1, 2, 3, . . . ) with 0 representing unlimited permission (i.e., the highest power state, with no power management) and each next higher numeric code representing a higher level of restriction. For example, permission level "n" may represent the devices in the group being powered off, and permission level "n−1" may represent the devices in the group being asleep. However, there is no predetermined permission or restriction for a permission level code. The permissions and rules are associated with a level, and are defined and configured for a given system application or even dynamically for given runtime environment on a system. For example, an Internet server may be used to provide added capacity for peak demand periods, and otherwise reside in a low power state until required for increased demands.

Figure 6:
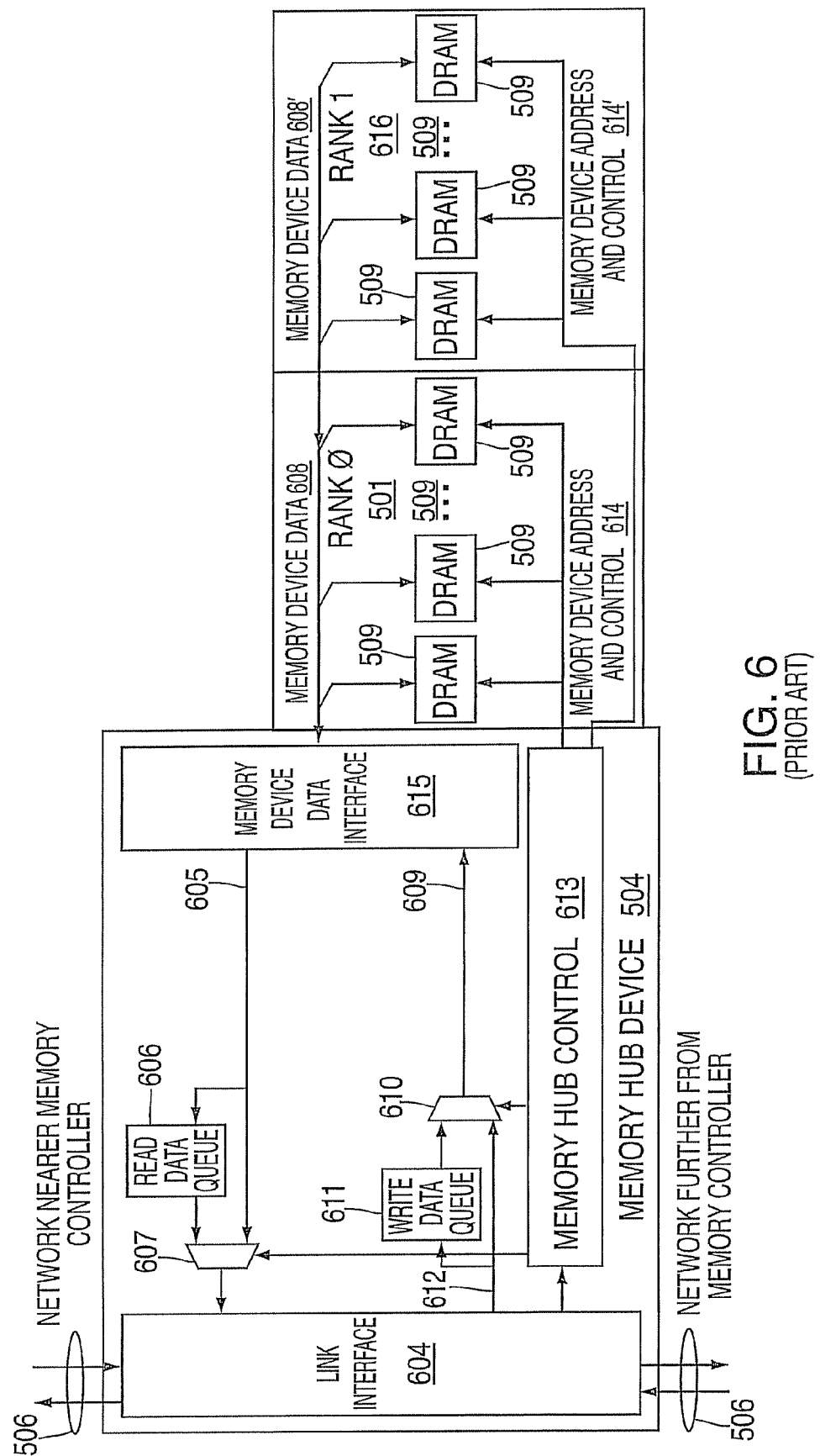
FIG. 6 is a block diagram of an exemplary hub device in a memory subsystem.
Figure 7:
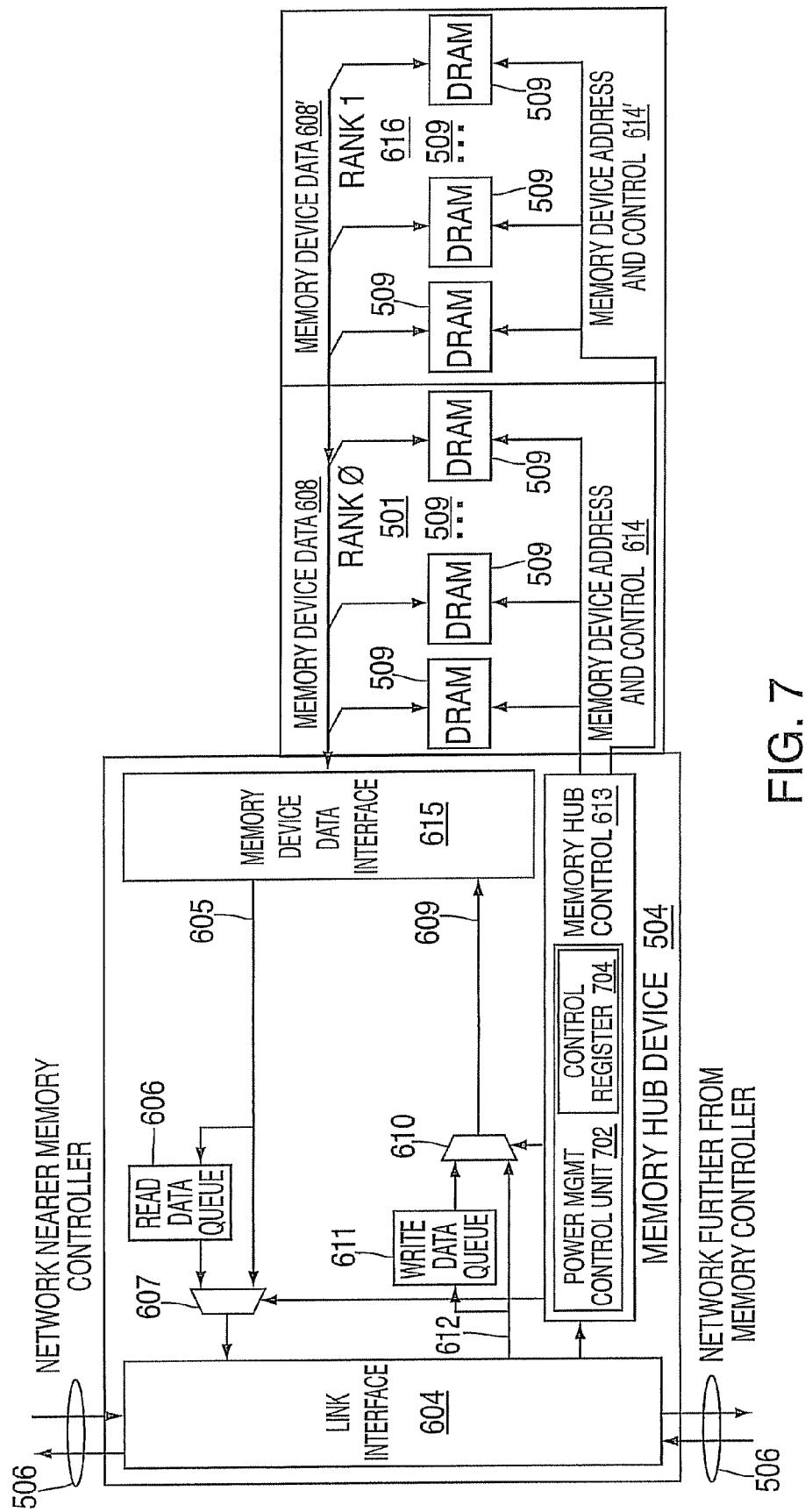
FIG. 7 is a block diagram of an exemplary hub device including a power management control unit that may be implemented by exemplary embodiments.

FIG. 7 is a block diagram of an exemplary hub device including a power management control unit that may be implemented by exemplary embodiments. The hub device in FIG. 7 performs the same functions described above with reference to FIG. 6 along with the added function of autonomous power management. FIG. 7 includes a power management control unit 702 located in the memory hub control 613 for autonomously managing the power of the memory devices 509 attached to the hub device 504 in accordance with a power management framework (such as the ones depicted below in FIG. 8). The power management control unit 702 includes a configurable control register(s) 704 with information such as, but not limited to, minimum power level code, maximum power level code, and control mode for establishing manual mode or automatic mode. In addition, the control register(s) 704 may include control register bits indicating what power level is associated with the facility as well as the current power level. The control register(s) 704 are utilized by the control unit 702 to manage the power on the memory devices. In alternate embodiments, all or a portion of the control register(s) 704 are located outside of the power management control unit 702.

FIG. 8 depicts the logical permission hierarchical framework comprising exemplary embodiments, including the mapping of physical system power management facilities to logical permission levels, device groups, functional states, and functional groups to support a system operation. A rules framework, such as the one depicted in FIG. 8, may be implemented by a control unit for autonomously managing power according to the associative mapping of power controls to the rules framework. Logical permission levels 0 801 though "n" 806 are assigned to specific physical system power management facilities available for limiting power consumption. Physical system power management facilities may include, but are not limited to: powering down the device, putting the device in sleep mode, putting the device in a low power mode, putting the device in a full performance mode, putting the device in self-refresh mode, clock gating, increased command spacing, frequency management (e.g., reduced frequency of operation), and priority management (e.g., delaying lower priority commands).

The functional states 0 through "m" represent higher level system operational states, (for example, "full service", "low power", "sleep mode", etc.), such that any number of permission levels may comprise a functional state. Although two are shown, a system may have any number of configuration functional groups (807, 808) that assign all or a portion of the permission levels 801-806 and functional states 811-813 differently for optimization of quality of service and/or performance. For example, the same system may be configured to implement any one of several functional groups of functional states, device groups and permission levels, depending on the application (e.g., a scientific computer server, or an internet server, or an archive file server). The permission levels for functional groups are stored as records in the file system or memory for software configuration, responsive to compute application and/or environmental conditions.

In exemplary embodiments, the power management control unit 702 depicted in FIG. 7 monitors memory activity (as initiated by the memory controller, the memory hub or any other device) and requests and/or receives physical state information from the memory devices or other memory subsystem components/sensors (as available based on the device technology). Device group "0" 813 and device group "1" 814 each pertain to a grouping of one or more devices (e.g., a 'rank' of memory devices 509) that serve a common function and are grouped together to enable the devices to shift, as a unit, between various "minimum" and "maximum" permission levels (i.e., power states) based on the performance, power and/or thermal demands related to that group, the subsystem or the entire system. The logical permission framework provides the means for having a hierarchy of power controllers within the system (510, 504, etc.), each with its own level of autonomy operating within its own assigned permission levels while the framework controls the functional states and permission levels for the power controllers. For example, the memory controller 510 may have a power control unit that operates at a higher hierarchical level over the power control units in the memory hub devices 504. The memory controller 510 may be able to reconfigure or control the priorities in the memory hub devices 504 in regard to permitted level(s) and functional states for power management.

In the example depicted in FIG. 8, device group "1" 814 is associated with a memory rank which is regularly accessed during normal system operation, whereas device group "0" 813 is expected to be less frequently accessed and/or includes information that can be accessed at a slower rate and/or increased latency. As evidenced in FIG. 8, device group "1" 814 is permitted to operate within permission level "0" 801, permission level "1" 802 and permission level "2" 803 (i.e., the highest power state). In contrast, device group "0" 813 is permitted to operate within permission level "2" 803 and permission level "3" 804, resulting in reduced power consumption for that device group and generally lower performance as well.

In exemplary embodiments, the device groups and permission levels will generally be assigned at system power-up, after completion of the memory detection and functional verification, at which time the available memory system characteristics are known to the system, and these device groups and permission levels can be assigned. During normal operation of the system, device group "0" 813 and device group "1" 814 will shift between the assigned permission level ranges, based on local (e.g., hub-based) analysis of activity (e.g., access patterns within the one or more device groups), device thermal characteristics (memory device 509, hub device 504, EEPROM, buffer or other temperature sensing device), or other mechanism by which the characteristics of the device groups can be locally determined.

In exemplary embodiments, the permission levels for these device groups are not the only permission levels in which the devices may operate. The memory system may, under the direction of the memory controller 510 be placed in other higher power or lower power states than those identified by device group "0" 813 and/or device group "1" 814 settings. Once this override is removed by the memory controller 510, by allowing the memory to operate over a wide range of permission levels, the memory subsystem will return to operation within the permission level range defined in the associated device group, in response to local analysis and control of the operating environment.

In exemplary embodiments, the memory controller 510 uses message packets to control, configure, and synchronize the power management facilities in the hub devices. In addition, the hub devices may pass state information back to the memory controller 510 via message packets. The memory controller 510 may utilize this information to perform power management functions. For example, a temperature measurement at a hub device (e.g., a memory device temperature) may exceed a defined operating temperature. In response to detecting the elevated temperature, the hub device may send a status packet to the memory controller 510 indicating the existence of the elevated temperature at the hub device. In response to receiving the status packet, the memory controller 510 may then male a determination, consistent with the operational characteristics of the given application, to broadcast new power management information to the one or more memory subsystems or rebroadcast the elevated temperature state detected at the hub device to all devices in the device group associated with the memory device with the elevated temperature. In the latter case, the receiving memory subsystem (s) would respond to the elevated temperature state in accordance to previously defined rules to select the appropriate permission level(s) for operation during the period in which the elevated temperature state exists, so that they can respond in unison.

Functional Group "0" 807 and functional Group "1" 808 depicted in FIG. 8 describe two of the possible sets of permission level ranges within which the device group 0 813 and device group 1 814 may operate under local control, and which can be changed at various times during system operation based on expected loading, external thermal or power inputs, maintenance activities, or other purposes known to the system but not evident to the local device groups.

Referring to FIG. 8, functional group 0 describes the range of permission levels, as defined by the memory controller 510 to hub 504, that device group "0" 813 and device group "1" 814 may operate within, as further described by functional state "0" 811 and functional state "m" 816. Using the example of an internet server, having a wide range of activity levels, functional state "0" 811 would represent a normal system operating mode, and would further permit the various system elements to operate within permission level "0" 801 and permission level "3" 804, thereby enabling device group "0" 813 and device group "1" 814 to operate under autonomous control, to the full range of permission levels established for the respective device groups. Device group "0" 813 would operate under autonomous control at permission level "2" 803 and/or permission level "3" 804 in functional state "0" 811 as depicted in FIG. 8. Similarly, device group "1" 814 would operate under autonomous control at permission level "2" 803, permission level "1" 802 and/or permission level "0" 801. In this example, permission level "4" would not be used, although a change in the system operating environment could result in a change to the permission levels assigned to device group 0 813 and/or device group 1 814, which might then include or even require operation at permission level "4".

Referring to FIG. 8, functional group "1" 808 depicts a second set of system operating states within which the memory system may operate, and includes functional state "0" 811, functional state "1" 812 and functional state "m" 816. Functional state "0" 811 limits the memory system operation to permission level "0" 801 (the highest power state in which the memory can operate) and permission level "1" 802. In exemplary embodiments, device group "0" 813 will operate at permission level "0" 801 when functional state "0" 811 is applied. In this case, the permission levels assigned to device group "0" 813 do not include permission level "0" 801 or permission level "1" 802 and highest level of performance in functional state "0" 811 is assigned to device group "0" 813. In other exemplary embodiments, other selection criteria (e.g., lowest level of power and/or performance within the functional state) may be applied when the range of the functional state falls outside of the range of the device group. In exemplary embodiments, device group "1" 814 will operate at permission level "0" 801 or permission level "1" 802 when functional state "0" 811 is applied. In this case, the memory system power may be autonomously managed by shifting one or more elements of the system between the two power states, as defined by the permission level "0" 801 and permission level "1" 802, based on local analysis of memory activity.

Referring to functional group "1" 808 in FIG. 8, functional state "1" 812 allows the memory devices to operate only at permission level "2" 803. Functional state "1" 812 will effectively eliminate autonomous (local) control of the one or more device groups (in FIG. 8 device group "0" 813 and device group "1" 814) for the duration that functional state "1" 812 of functional group 1 is invoked, since only one permission level is assigned to functional state "1" 812. Functional state "1" 812 constrains the memory system operation to permission level "2" 803, resulting in a slightly lower power and reduced performance operation that might relate to a power or thermally constrained environment. Functional state "m" 816 includes permission level "3" 804. Device group "0" 813 and device group "1" 814 will operate at permission level "3" in functional state "m" 816.

Although two are shown, the system may have any number of functional groups that allocate permission level "0" 801 through permission level "n" 806 for optimization of quality of service or performance. In exemplary embodiments, the permissions for functional groups are predetermined and stored as records in memory for software configuration, responsive to computer applications and/or environmental conditions.

Although two are shown (device group "0" 813 and device group "1" 814) any number of device groups may exist with specific permission levels. For example one group of memory devices may be comprised of memory devices that are infrequently referenced or contain data that is not reference latency sensitive (e.g., castout pages), and therefore these devices can operate in a more aggressive power saving state without adversely affecting quality of service. In exemplary embodiments, power management is provided for both the individual devices in the group (e.g., maximum temperature for a device within the group) and for the devices as a whole group or within the group (e.g., maximum temperature for the group as a whole).

Exemplary embodiments provide the ability for the memory subsystem to operate in two power management modes. In a first mode, manual mode, the memory controller 510 directs the memory subsystem to operate at a specific power management permission level. In the first mode, the memory controller 510 has total control of the power management in the memory subsystem. In a second mode, automatic mode, the memory controller 510 directs the memory subsystem to operate power management completely autonomously (i.e., independently) or autonomously within particular limits imposed by the device grouping, permission levels and/or functional states which may be assigned within one or more functional groups.

Exemplary embodiments provide the ability for having devices (e.g., hub devices) autonomously manage power, within the prescribed limits established by the allowed permission levels. A device may operate across several permission levels between a prescribed minimum and maximum range of permission levels. Specific power level codes (or permission levels) are associated with specific power management techniques (e.g., full power operation, reduced frequency operation, self refresh, increased spacing between commands, etc), with mechanisms applied only when they can be exercised or invoked (i.e., a power reducing mechanism can only be invoked when a device is operating at a power level that permits a change to the targeted new power level). Reduced frequency operation includes such techniques as a reduction in the local memory clock frequency and/or waiting a set number of clock cycles before performing an operation (or steps within a memory access). Increased spacing adds a delay between commands being sent to the memory device(s) 509.

In exemplary embodiments, in addition to receiving initial memory operational information (interface characteristics, memory timings, command sequences, etc) upon completion of power-up and initialization, real-time memory hub control operation will be further influenced by power management control unit 702. Upon receipt of an access request from the memory controller 510, the memory hub control unit will compile the appropriate sequence of commands to initiate the access to the memory device(s), in addition to controlling the read 607 and write 610 data flow selectors and other internal hub circuitry. The power management control unit 702 will further influence the command and/or operational sequence/timings, based on the current functional state of the memory, the permission level(s) currently assigned to that memory "group", and/or the current functional state assigned to that "group". The impact of the power management control unit 702 on the memory access may range from being undetectable (optimal command/data sequence issued) to adding significant access delay—such as when the memory devices must be preconditioned prior to the access (e.g., if they were autonomously placed in a "self refresh" or other low power mode) or if added clock counts are included in the command sequence, as a means of reducing local power and/or temperature.

In exemplary embodiments, the operation of the power management control unit 702 includes hysteresis as associated with any change in permission levels for device groups, to ensure that adequate time is available for the memory system to react to a change in state, as well as to ensure that the memory system does not become unstable and/or unavailable for an extended period. In other exemplary embodiments, the delay between these changes will be programmable, via a register setting, to maximize system flexibility. As known in the art, hysteresis allows a system change to settle before being followed by another change.

Devices (e.g. memory controller, memory hub devices, and/or memory devices) that can autonomously manage their own power, or that of other devices, will have configurable registers within them for operating according to exemplary embodiments described herein. These registers may include, but are not limited to a control register 704 implemented in hardware and a control register 704 implemented in software. The control register 704 may include information such as: minimum power level code (or permission level), maximum power level code (or permission level), manual power level code (or permission level), and control mode for establishing manual mode or automatic mode. Moreover, the power management facilities with these devices have hardware control register bits indicating what power level(s) (or permission level(s)) is associated with the facility as well as the current power level, for each of the possible memory groups.

In exemplary embodiments, system software provides the initial configuration of the power level (or permission level)

codes and associations within all hardware. Certain devices, particularly the memory controller 510, will have a specific degree of freedom to operate across multiple power levels depending on environmental conditions and the implied power management goals of the configuration. The memory controller 510 issues specific commands on the memory hub communication channel (using the memory bus 506) to enable, disable, or set one or more specific power permission level(s) in a memory hub device 504 and/or memory device 509. At any time, system software may intervene to redefine or manually override the current power management state (e.g., using a functional group or permission level override)—although this override may further be influenced by the hysteresis setting(s) in conjunction with prior state change (s).

Exemplary embodiments include a computing system with a processor(s) and an I/O unit(s) (e.g., requestors) interconnected to a memory system that contains a memory controller and memory devices. The computer memory system includes a physical memory array with a plurality of memory devices for storing data and instructions. These memory devices may be connected directly to the memory controller and/or indirectly coupled to the memory controller through hub devices. In exemplary embodiments, the hub-based computer memory system has memory devices attached to a communication hub device that is connected to a memory control device (e.g., a memory controller). Also in exemplary embodiments, the hub device is located on a memory module (e.g, a single substrate or physical device) that includes two or more hub devices that are cascaded interconnected to each other (and possibly to another hub device located on another memory module) via the memory bus.

Hub devices may be connected to the memory controller through a multi-drop or point-to-point bus structure (which may further include a cascade connection to one or more additional hub devices). Memory access requests are transmitted by the memory controller through the bus structure (e.g., the memory bus) to the selected hub(s). In response to receiving the memory access requests, the hub device translates the memory access requests to control the memory devices to store write data from the hub device or to provide read data to the hub device. Read data is encoded into one or more communication packet(s) and transmitted through the memory bus(ses) to the memory controller.

In alternate exemplary embodiments, the memory controller(s) may be integrated together with one or more processor chips and supporting logic, packaged in a discrete chip (commonly called a "northbridge" chip), included in a multi-chip carrier with the one or more processors and/or supporting logic, or packaged in various alternative forms that best match the application/environment. Any of these solutions may or may not employ one or more narrow/high speed links to connect to one or more hub chips and/or memory devices.

The memory modules may be implemented by a variety of technology including a DIMM, a single in-line memory module (SIMM) and/or other memory module or card structures. In general, a DIMM refers to a small circuit board which is comprised primarily of random access memory (RAM) integrated circuits or die on one or both sides with signal and/or power pins on both sides of the board. This can be contrasted to a SIMM which is a small circuit board or substrate composed primarily of RAM integrated circuits or die on one or both sides and single row of pins along one long edge. The DIMM depicted in FIG. 1 includes 168 pins in the exemplary embodiment, whereas subsequent DIMMs have been constructed with pincounts ranging from 100 pins to over 300 pins. In exemplary embodiments described herein, memory modules may include two or more hub devices.

In exemplary embodiments, the memory bus is constructed using multi-drop connections to hub devices on the memory modules and/or using point-to-point connections. The downstream portion of the controller interface (or memory bus), referred to as the downstream bus, may include command, address, data and other operational, initialization or status information being sent to the hub devices on the memory modules. Each hub device may simply forward the information to the subsequent hub device(s) via bypass circuitry; receive, interpret and re-drive the information if it is determined to be targeting a downstream hub device; re-drive some or all of the information without first interpreting the information to determine the intended recipient; or perform a subset or combination of these options.

The upstream portion of the memory bus, referred to as the upstream bus, returns requested read data and/or error, status or other operational information, and this information may be forwarded to the subsequent hub devices via bypass circuitry; be received, interpreted and re-driven if it is determined to be targeting an upstream hub device and/or memory controller in the processor complex; be re-driven in part or in total without first interpreting the information to determine the intended recipient; or perform a subset or combination of these options.

In alternate exemplary embodiments, the point-to-point bus includes a switch or bypass mechanism which results in the bus information being directed to one of two or more possible hub devices during downstream communication (communication passing from the memory controller to a hub device on a memory module), as well as directing upstream information (communication from a hub device on a memory module to the memory controller), often by way of one or more upstream hub devices. Further embodiments include the use of continuity modules, such as those recognized in the art, which, for example, can be placed between the memory controller and a first populated hub device (i.e., a hub device that is in communication with one or more memory devices), in a cascade interconnect memory system, such that any intermediate hub device positions between the memory controller and the first populated hub device include a means by which information passing between the memory controller and the first populated hub device can be received even if the one or more intermediate hub device position(s) do not include a hub device. The continuity module(s) may be installed in any module position(s), subject to any bus restrictions, including the first position (closest to the main memory controller, the last position (prior to any included termination) or any intermediate position(s). The use of continuity modules may be especially beneficial in a multi-module cascade interconnect bus structure, where an intermediate hub device on a memory module is removed and replaced by a continuity module, such that the system continues to operate after the removal of the intermediate hub device. In more common embodiments, the continuity module(s) would include either interconnect wires to transfer all required signals from the input(s) to the corresponding output(s), or be re-driven through a repeater device. The continuity module(s) might further include a non-volatile storage device (such as an EEPROM), but would not include main memory storage devices.

In exemplary embodiments, the memory system includes one or more hub devices on one or more memory modules connected to the memory controller via a cascade interconnect memory bus, however other memory structures may be implemented such as a point-to-point bus, a multi-drop memory bus or a shared bus. Depending on the signaling methods used, the target operating frequencies, space, power, cost, and other constraints, various alternate bus structures may be considered. A point-to-point bus may provide the optimal performance in systems produced with electrical interconnections, due to the reduced signal degradation that may occur as compared to bus structures having branched signal lines, switch devices, or stubs. However, when used in systems requiring communication with multiple devices or subsystems, this method will often result in significant added component cost and increased system power, and may reduce the potential memory density due to the need for intermediate buffering and/or re-drive.

Although not shown in the Figures, the memory modules or hub devices may also include a separate bus, such as a 'presence detect' bus, an I2C bus and/or an SMBus which is used for one or more purposes including the determination of the hub device an/or memory module attributes (generally after power-up), the reporting of fault or status information to the system, the configuration of the hub device(s) and/or memory subsystem(s) after power-up or during normal operation or other purposes. Depending on the bus characteristics, this bus might also provide a means by which the valid completion of operations could be reported by the hub devices and/or memory module(s) to the memory controller (s), or the identification of failures occurring during the execution of the main memory controller requests.

Performances similar to those obtained from point-to-point bus structures can be obtained by adding switch devices. These and other solutions offer increased memory packaging density at lower power, while retaining many of the characteristics of a point-to-point bus. Multi-drop busses provide an alternate solution, albeit often limited to a lower operating frequency, but at a cost/performance point that may be advantageous for many applications. Optical bus solutions permit significantly increased frequency and bandwidth potential, either in point-to-point or multi-drop applications, but may incur cost and space impacts.

As used herein the term "buffer" or "buffer device" refers to a temporary storage unit (as in a computer), especially one that accepts information at one rate and delivers it another. In exemplary embodiments, a buffer is an electronic device that provides compatibility between two signals (e.g., changing voltage levels or current capability). The term "hub" is sometimes used interchangeably with the term "buffer." A hub is a device containing multiple ports that is connected to several other devices. A port is a portion of an interface that serves a congruent I/O functionality (e.g., a port may be utilized for sending and receiving data, address, and control information over one of the point-to-point links, or busses). A hub may be a central device that connects several systems, subsystems, or networks together. A passive hub may simply forward messages, while an active hub, or repeater, amplifies and refreshes the stream of data which otherwise would deteriorate over a distance. The term hub device, as used herein, refers to a hub chip that includes logic (hardware and/or software) for performing memory functions.

Also as used herein, the term "bus" refers to one of the sets of conductors (e.g., wires, and printed circuit board traces or connections in an integrated circuit) connecting two or more functional units in a computer. The data bus, address bus and control signals, despite their names, constitute a single bus since each are often useless without the others. A bus may include a plurality of signal lines, each signal line having two or more connection points, that form a main transmission path that electrically connects two or more transceivers, transmitters and/or receivers. The term "bus" is contrasted with the term "channel" which is often used to describe the function of a "port" as related to a memory controller in a memory system, and which may include one or more busses or sets of busses. The term "channel" as used herein refers to a port on a memory controller. Note that this term is often used in conjunction with I/O or other peripheral equipment, however the term channel has been adopted by some to describe the interface between a processor or memory controller and one of one or more memory subsystem(s).

Further, as used herein, the term "daisy chain" refers to a bus wiring structure in which, for example, device A is wired to device B, device B is wired to device C, etc. The last device is typically wired to a resistor or terminator. All devices may receive identical signals or, in contrast to a simple bus, each device may modify one or more signals before passing them on. A "cascade" or cascade interconnect' as used herein refers to a succession of stages or units or a collection of interconnected networking devices, typically hubs, in which the hubs operate as a logical repeater, further permitting merging data to be concentrated into the existing data stream. Also as used herein, the term "point-to-point" bus and/or link refers to one or a plurality of signal lines that may each include one or more terminators. In a point-to-point bus and/or link, each signal line has two transceiver connection points, with each transceiver connection point coupled to transmitter circuitry, receiver circuitry or transceiver circuitry. A signal line refers to one or more electrical conductors or optical carriers, generally configured as a single carrier or as two or more carriers, in a twisted, parallel, or concentric arrangement, used to transport at least one logical signal.

Memory devices are generally defined as integrated circuits that are composed primarily of memory (storage) cells, such as DRAMs (Dynamic Random Access Memories), SRAMs (Static Random Access Memories), FeRAMs (Ferro-Electric RAMs), MRAMs (Magnetic Random Access Memories), Flash Memory and other forms of random access and related memories that store information in the form of electrical, optical, magnetic, biological or other means. Dynamic memory device types may include asynchronous memory devices such as FPM DRAMs (Fast Page Mode Dynamic Random Access Memories), EDO (Extended Data Out) DRAMs, BEDO (Burst EDO) DRAMs, SDR (Single Data Rate) Synchronous DRAMs, DDR (Double Data Rate) Synchronous DRAMs or any of the expected follow-on devices such as DDR2, DDR3, DDR4 and related technologies such as Graphics RAMs, Video RAMs, LP RAM (Low Power DRAMs) which are often based on the fundamental functions, features and/or interfaces found on related DRAMs.

Memory devices may be utilized in the form of chips (die) and/or single or multi-chip packages of various types and configurations. In multi-chip packages, the memory devices may be packaged with other device types such as other memory devices, logic chips, analog devices and programmable devices, and may also include passive devices such as resistors, capacitors and inductors. These packages may include an integrated heat sink or other cooling enhancements, which may be further attached to the immediate carrier or another nearby carrier or heat removal system.

Module support devices (such as buffers, hubs, hub logic chips, registers, PLL's, DLL's, non-volatile memory, etc) may be comprised of multiple separate chips and/or components, may be combined as multiple separate chips onto one or more substrates, may be combined onto a single package or even integrated onto a single device—based on technology, power, space, cost and other tradeoffs. In addition, one or more of the various passive devices such as resistors, capacitors may be integrated into the support chip packages, or into the substrate, board or raw card itself, based on technology, power, space, cost and other tradeoffs. These packages may include an integrated heat sink or other cooling enhancements, which may be further attached to the immediate carrier or another nearby carrier or heat removal system.

Memory devices, hubs, buffers, registers, clock devices, passives and other memory support devices and/or components may be attached to the memory subsystem and/or hub device via various methods including solder interconnects, conductive adhesives, socket structures, pressure contacts and other methods which enable communication between the two or more devices via electrical, optical or alternate means.

The one or more memory modules (or memory subsystems) and/or hub devices may be connected to the memory system, processor complex, computer system or other system environment via one or more methods such as soldered interconnects, connectors, pressure contacts, conductive adhesives, optical interconnects and other communication and power delivery methods. Connector systems may include mating connectors (male/female), conductive contacts and/or pins on one carrier mating with a male or female connector, optical connections, pressure contacts (often in conjunction with a retaining mechanism) and/or one or more of various other communication and power delivery methods. The interconnection(s) may be disposed along one or more edges of the memory assembly and/or placed a distance from an edge of the memory subsystem depending on such application requirements as ease-of-upgrade/repair, available space/volume, heat transfer, component size and shape and other related physical, electrical, optical, visual/physical access, etc.

As used herein, the term memory subsystem refers to, but is not limited to: one or more memory devices; one or more memory devices and associated interface and/or timing/control circuitry; and/or one or more memory devices in conjunction with a memory buffer, hub device, and/or switch. The term memory subsystem may also refer to one or more memory devices, in addition to any associated interface and/or timing/control circuitry and/or a memory buffer, hub device or switch, assembled into a substrate, a card, a module or related assembly, which may also include a connector or similar means of electrically attaching the memory subsystem with other circuitry. The memory modules described herein may also be referred to as memory subsystems because they include one or more memory devices and hub devices Additional functions that may reside local to the memory subsystem and/or hub device include write and/or read buffers, one or more levels of memory cache, local pre-fetch logic, data encryption/decryption, compression/decompression, protocol translation, command prioritization logic, voltage and/or level translation, error detection and/or correction circuitry, data scrubbing, local power management circuitry and/or reporting, operational and/or status registers, initialization circuitry, performance monitoring and/or control, one or more co-processors, search engine(s) and other functions that may have previously resided in other memory subsystems. By placing a function local to the memory subsystem, added performance may be obtained as related to the specific function, often while making use of unused circuits within the subsystem.

Memory subsystem support device(s) may be directly attached to the same substrate or assembly onto which the memory device(s) are attached, or may be mounted to a separate interposer or substrate also produced using one or more of various plastic, silicon, ceramic or other materials which include electrical, optical or other communication paths to functionally interconnect the support device(s) to the memory device(s) and/or to other elements of the memory or computer system.

Information transfers (e.g. packets) along a bus, channel, link or other naming convention applied to an interconnection method may be completed using one or more of many signaling options. These signaling options may include such methods as single-ended, differential, optical or other approaches, with electrical signaling further including such methods as voltage or current signaling using either single or multi-level approaches. Signals may also be modulated using such methods as time or frequency, non-return to zero, phase shift keying, amplitude modulation and others. Voltage levels are expected to continue to decrease, with 1.5V, 1.2V, 1V and lower signal voltages expected consistent with (but often independent of) the reduced power supply voltages required for the operation of the associated integrated circuits themselves.

One or more clocking methods may be utilized within the memory subsystem and the memory system itself, including global clocking, source-synchronous clocking, encoded clocking or combinations of these and other methods. The clock signaling may be identical to that of the signal lines themselves, or may utilize one of the listed or alternate methods that is more conducive to the planned clock frequency (ies), and the number of clocks planned within the various subsystems. A single clock may be associated with all communication to and from the memory, as well as all clocked functions within the memory subsystem, or multiple clocks may be sourced using one or more methods such as those described earlier. When multiple clocks are used, the functions within the memory subsystem may be associated with a clock that is uniquely sourced to the subsystem, or may be based on a clock that is derived from the clock related to the information being transferred to and from the memory subsystem (such as that associated with an encoded clock). Alternately, a unique clock may be used for the information transferred to the memory subsystem, and a separate clock for information sourced from one (or more) of the memory subsystems. The clocks themselves may operate at the same or frequency multiple of the communication or functional frequency, and may be edge-aligned, center-aligned or placed in an alternate timing position relative to the data, command or address information.

Information passing to the memory subsystem(s) will generally be composed of address, command and data, as well as other signals generally associated with requesting or reporting status or error conditions, resetting the memory, completing memory or logic initialization and other functional, configuration or related information. Information passing from the memory subsystem(s) may include any or all of the information passing to the memory subsystem(s), however generally will not include address and command information. This information may be communicated using communication methods that may be consistent with normal memory device interface specifications (generally parallel in nature), the information may be encoded into a 'packet' structure, which may be consistent with future memory interfaces or simply developed to increase communication bandwidth and/or enable the subsystem to operate independently of the memory technology by converting the received information into the format required by the receiving device(s).

Initialization of the memory subsystem may be completed via one or more methods, based on the available interface busses, the desired initialization speed, available space, cost/complexity objectives, subsystem interconnect structures, the use of alternate processors (such as a service processor)

which may be used for this and other purposes, etc. In one embodiment, the high speed bus may be used to complete the initialization of the memory subsystem(s), generally by first completing a training process to establish reliable communication, then by interrogation of the attribute or 'presence detect' data associated the various components and/or characteristics associated with that subsystem, and ultimately by programming the appropriate devices with information associated with the intended operation within that system. In a cascaded system, communication with the first memory subsystem would generally be established, followed by subsequent (downstream) subsystems in the sequence consistent with their position along the cascade interconnect bus.

A second initialization method would include one in which the high speed bus is operated at one frequency during the initialization process, then at a second (and generally higher) frequency during the normal operation. In this embodiment, it may be possible to initiate communication with all of the memory subsystems on the cascade interconnect bus prior to completing the interrogation and/or programming of each subsystem, due to the increased timing margins associated with the lower frequency operation.

A third initialization method might include operation of the cascade interconnect bus at the normal operational frequency (ies), while increasing the number of cycles associated with each address, command and/or data transfer. In one embodiment, a packet containing all or a portion of the address, command and/or data information might be transferred in one clock cycle during normal operation, but the same amount and/or type of information might be transferred over two, three or more cycles during initialization. This initialization process would therefore be using a form of 'slow' commands, rather than 'normal' commands, and this mode might be automatically entered at some point after power-up and/or re-start by each of the subsystems and the memory controller by way of POR (power-on-reset) logic included in each of these subsystems.

A fourth initialization method might utilize a distinct bus, such as a presence detect bus (such as the one defined in U.S. Pat. No. 5,513,135 to Dell et al., of common assignment herewith), an I2C bus (such as defined in published JEDEC standards such as the 168 Pin DIMM family in publication 21-C revision 7R8) and/or the SMBUS, which has been widely utilized and documented in computer systems using such memory modules. This bus might be connected to one or more modules within a memory system in a daisy chain/cascade interconnect, multi-drop or alternate structure, providing an independent means of interrogating memory subsystems, programming each of the one or more memory subsystems to operate within the overall system environment, and adjusting the operational characteristics at other times during the normal system operation based on performance, thermal, configuration or other changes desired or detected in the system environment.

Other methods for initialization can also be used, in conjunction with or independent of those listed. The use of a separate bus, such as described in the fourth embodiment above, also offers the advantage of providing an independent means for both initialization and uses other than initialization, such as described in U.S. Pat. No. 6,381,685 to Dell et al., of common assignment herewith, including changes to the subsystem operational characteristics on-the-fly and for the reporting of and response to operational subsystem information such as utilization, temperature data, failure information or other purposes.

With improvements in lithography, better process controls, the use of materials with lower resistance, increased field sizes and other semiconductor processing improvements, increased device circuit density (often in conjunction with increased die sizes) will help facilitate increased function on integrated devices as well as the integration of functions previously implemented on separate devices. This integration will serve to improve overall performance of the intended function, as well as promote increased storage density, reduced power, reduced space requirements, lower cost and other manufacturer and customer benefits. This integration is a natural evolutionary process, and may result in the need for structural changes to the fundamental building blocks associated with systems.

The integrity of the communication path, the data storage contents and all functional operations associated with each element of a memory system or subsystem can be assured, to a high degree, with the use of one or more fault detection and/or correction methods. Any or all of the various elements may include error detection and/or correction methods such as CRC (Cyclic Redundancy Code), EDC (Error Detection and Correction), parity or other encoding/decoding methods suited for this purpose. Further reliability enhancements may include operation re-try (to overcome intermittent faults such as those associated with the transfer of information), the use of one or more alternate or replacement communication paths to replace failing paths and/or lines, complement-re-complement techniques or alternate methods used in computer, communication and related systems.

The use of bus termination, on busses as simple as point-to-point links or as complex as multi-drop structures, is becoming more common consistent with increased performance demands. A wide variety of termination methods can be identified and/or considered, and include the use of such devices as resistors, capacitors, inductors or any combination thereof, with these devices connected between the signal line and a power supply voltage or ground, a termination voltage or another signal. The termination device(s) may be part of a passive or active termination structure, and may reside in one or more positions along one or more of the signal lines, and/or as part of the transmitter and/or receiving device(s). The terminator may be selected to match the impedance of the transmission line, or selected via an alternate approach to maximize the useable frequency, operating margins and related attributes within the cost, space, power and other constraints.

Technical effects and benefits of exemplary embodiments include the ability to autonomously perform power management functions at a memory hub device. The hub device manages to permission level ranges set by the memory controller for groups of devices. In this manner, power may be kept within limitations required by the overall memory system. The hub device also manages to permission level ranges set within one or more functional grouping(s) consisting of one or more functional state(s). In this manner, the hub device provides different service levels depending on functional requirements (e.g., software application requirements). Also included is the ability to override the local power management with memory controller commands so that the memory controller can take back control of power management when required.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A memory system for storing and retrieving data for a processing system, the memory system comprising:
    a memory controller for receiving and responding to memory access requests;
    a memory bus in communication with the memory controller;
    a plurality of memory devices in communication with the memory controller via the memory bus, wherein one or more of the memory devices are associated with a group; and
    a control unit external to the memory controller for autonomously managing power within and for the group of memory devices, wherein input to the control unit includes a maximum and minimum power management permission level for the group of memory devices.

2. The memory system of claim 1 wherein the power management is performed according to an associative mapping of power controls to a rules framework.

3. The memory system of claim 1 wherein the group includes one memory device and the control unit is located on the memory device.

4. The memory system of claim 1 wherein the group includes a plurality of memory devices and the control unit is located on one of the memory devices in the group.

5. The memory system of claim 1 wherein the one or more memory devices in the group include a rank of devices.

6. The memory system of claim 1 wherein the one or more memory devices in the group include all memory devices in communication with one or more memory hub devices.

7. The memory system of claim 1 wherein the one or more memory devices in the group include all memory devices in communication with the memory controller.

8. The memory system of claim 1 wherein input to the control unit further includes a maximum and minimum permission level for a functional group associated with the group of memory devices.

9. The memory system of claim 1 wherein the power management is performed according to an associative mapping of power controls to a rules framework.

10. A memory system for storing and retrieving data for a processing system, the memory system comprising:
    a memory controller for receiving and responding to memory access requests;
    a plurality of memory devices;
    a memory bus in communication with the memory controller; and
    a memory hub device in communication with the memory bus, the memory hub device comprising:
        a memory interface for transferring data and control information between the memory hub device and the memory controller via the memory bus;
        a memory device interface for communicating with the memory devices;
        a control unit for autonomously managing power within and for the memory devices; and
        a configurable control register for storing a minimum power management permission level code and a maximum power management permission level code, wherein the contents of the control register area utilized by the control unit to manage the power.

11. The memory system of claim 10 wherein the power management is performed according to an associative mapping of power controls to a rules framework.

12. The memory system of claim 10 wherein the control register further stores one or both of a manual permission level code, and a control mode for establishing a manual mode or an automatic mode.

13. The memory system of claim 10 wherein the memory hub device flirt her comprises at least one power savings means and the configurable control register further stores associated control register bits indicating at least one permission level code to which said power savings means is associated.

14. The memory system of claim 10 wherein the memory hub device flirt her comprises:
    means for determining one or more of power consumption, temperature, and activity level, wherein;
    the configurable control register further stores associated control register bits indicating one or more of power consumption, temperature, and activity level associated with a power management permission level code.

15. The memory system of claim 10 wherein the control unit includes one or more of hysteresis settings and circuitry to control the rate at which permission level settings associated with one or more device groups are made.

16. The memory system of claim 10 wherein the hub device indicates one or more of power consumption, temperature and activity level to the memory controller via one or more of the memory interface and a feedback path.

17. The memory system of claim 10 wherein the contents of the control register are utilized by the control unit to manage the power, and the memory controller transmits commands via the memory bus and memory interface to the memory hub device to control the contents of the control unit register.

18. A method for managing power in a memory system, the method comprising:
    receiving a target permission level for a group of memory devices, the target permission level indicating limits for one or more of power consumption, temperature and activity level, the target permission level within a maximum and minimum power management permission level for the group of memory devices;

monitoring one or more of power consumption, temperature and activity level of the group of memory devices; and invoking a power savings means if one or more of: the power consumption has exceeded its associated limit, the temperature has exceeded its associated limit, or the activity level is below its associated limit.

19. The method of claim 18 further comprising invoking the power savings means if a current permission level is lower than the target permission level.

20. The method of claim 18 wherein the power savings means includes moving to a higher permission level or generating a notification if the current permission level is the maximum power management permission level.

21. A memory subsystem comprising:
a plurality of memory devices; and
one or more memory hub devices in communication with a memory bus, each memory hub device including:
a memory interface for transferring data and control information between the memory hub device and a memory controller via the memory bus;
a memory device interface for communicating with the memory devices;
a control unit for autonomously managing power within and for the memory devices; and
a configurable control register for storing a minimum power management permission level code and a maximum power management permission level code, wherein the contents of the control register are utilized by the control unit to manage the power.

22. The memory system of claim 21 wherein the control register further stores one or both of a manual permission level code, and a control mode for establishing a manual mode or an automatic mode.

23. The memory system of claim 21 wherein each memory hub device further comprises at least one power savings means and the configurable control register further stores associated control register bits indicating at least one permission level code to which said power savings means is associated.

24. The memory system of claim 21 wherein each memory hub device further comprises:

means for determining one or more of power consumption, temperature, and activity level, wherein the
configurable control register further stores associated control register bits indicating one or more of power consumption, temperature, and activity level associated with a permission level code.

25. A memory hub device comprising:
a memory interface for transferring data and control information between the memory hub device and a memory controller via a memory bus;
a memory device interface for communicating with memory devices attached to the memory hub device;
a control unit for autonomously managing power within and for the memory devices; and
a configurable control register for storing a minimum power management permission level code and a maximum power management permission level code, wherein the contents of the control register are utilized by the control unit to manage the power.

26. The hub device of claim 25 wherein the power management is performed according to an associative mapping of power controls to a rules framework.

27. The memory hub device of claim 25 wherein the control register further stores one or both of a manual permission level code, and a control mode for establishing a manual mode or an automatic mode.

28. The memory hub device of claim 25 further comprising at least one power savings means and the configurable control register further stores associated control register bits indicating at least one permission level code to which said power savings means is associated.

29. The memory hub device of claim 25 further comprising:
means for determining one or more of power consumption, temperature, and activity level, wherein
the configurable control register further stores associated control register bits indicating one or more of power consumption, temperature, and activity level associated with a permission level code.

* * * * *